(12) United States Patent
Nixon et al.

(10) Patent No.: US 12,366,447 B2
(45) Date of Patent: Jul. 22, 2025

(54) AIRBORNE AND SPACEBORNE IMAGING SURVEY PLATFORM

(71) Applicants: Stuart Nixon, Monaco (MC); Max Christian Funck, Potsdam (DE)

(72) Inventors: Stuart Nixon, Monaco (MC); Max Christian Funck, Potsdam (DE)

( * ) Notice: Subject to any disclaimer, the term of this patent is extended or adjusted under 35 U.S.C. 154(b) by 767 days.

(21) Appl. No.: 17/688,139

(22) Filed: Mar. 7, 2022

(65) Prior Publication Data

US 2023/0280159 A1 Sep. 7, 2023

(51) Int. Cl.
| | | |
|---|---|---|
| G02B 26/08 | (2006.01) | |
| G01C 11/02 | (2006.01) | |
| G06T 5/50 | (2006.01) | |

(52) U.S. Cl.
CPC .............. G01C 11/02 (2013.01); G06T 5/50 (2013.01); *G06T 2207/10032* (2013.01)

(58) Field of Classification Search
CPC ......... G01C 11/02; G01C 11/025; G06T 5/50; G06T 2207/10032
See application file for complete search history.

(56) References Cited

U.S. PATENT DOCUMENTS

| | | | |
|---|---|---|---|
| 5,371,358 A * | 12/1994 | Chang ................. | G01J 3/28 250/236 |
| 6,473,119 B1 | 10/2002 | Teuchert | |
| 7,630,579 B2 | 12/2009 | Mai et al. | |
| 8,248,499 B2 | 8/2012 | Sutton et al. | |
| 8,797,406 B2 | 8/2014 | Kostrzewski et al. | |
| 9,256,056 B2 | 2/2016 | Marks et al. | |
| 9,440,750 B2 | 9/2016 | Lapstun et al. | |
| 11,131,549 B2 | 9/2021 | Dawson et al. | |
| 2009/0295924 A1 | 12/2009 | Peters, III | |
| 2010/0013927 A1 | 1/2010 | Nixon | |
| 2011/0211106 A1 * | 9/2011 | Marks ................. | G02B 13/006 348/340 |

(Continued)

FOREIGN PATENT DOCUMENTS

| | | |
|---|---|---|
| EP | 1779060 B1 | 1/2012 |
| WO | 9407117 A2 | 3/1994 |

OTHER PUBLICATIONS

International Search Report and Written Opinion issued in PCT/IB2023/000072, dated Jun. 20, 2023, (pp. 1-13).

*Primary Examiner* — Euncha P Cherry
(74) *Attorney, Agent, or Firm* — Blueshift IP; Robert Plotkin

(57) ABSTRACT

An imaging survey platform utilizes imaging sensors arranged in one or more arcs to capture nadir and oblique views as required for photogrammetric processing into image maps and 3D surface maps, where a common primary lens subsystem is used by sensors within an arc. The primary lens subsystem can project onto a curved (e.g., spherical) surface rather than onto a planar surface. This solves a limiting first order optical problem for airborne or spaceborne image capture. To fill missing data between sensors edges on an arc, a second and offset arc of sensors or a scanning mirror in front of the primary mirror system can be used. Each imaging sensor can be mounted on and controlled by its own computer, with this subsystem in turn may be mounted onto the arc using piezoelectric actuators to fine tune alignment image sensor relative to the primary lens subsystem.

33 Claims, 22 Drawing Sheets

(56) References Cited

U.S. PATENT DOCUMENTS

| | | | |
|---|---|---|---|
| 2013/0076900 A1* | 3/2013 | Mrozek | G02B 13/14 359/356 |
| 2013/0278818 A1 | 10/2013 | Sutton et al. | |
| 2017/0195569 A1 | 7/2017 | Lapstun | |
| 2019/0084698 A1 | 3/2019 | Leatham | |
| 2020/0106941 A1 | 4/2020 | Cope et al. | |
| 2021/0165207 A1* | 6/2021 | Peyman | G02B 7/28 |

* cited by examiner

SINGLE CHANNEL OF CATADIOPTRIC SYSTEM

AIRBORNE AND SPACEBORNE IMAGING SURVEY PLATFORM

BACKGROUND

Aerial and spaceborne imaging survey platforms are used to capture data that is processed using photogrammetry into image maps and 2.5D or 3D surface maps. These are very useful for navigation, visualization, modelling, mapping and many other applications. Capturing data for entire cities or countries introduces many challenges, which up until now have only been partially solved. Ideally, high resolution imaging survey platforms capture three strips of imagery, with each strip imaging +45 to −45 degrees in the roll axis, and the three strips imaging at +45, 0 and −45 degrees in the pitch axis. FIG. 1 shows a full possible field of view, and the desired view angles from an aircraft- or spacecraft-based imaging survey platform is shown in FIG. 2A. As the imaging survey platform moves forward, this results in imaging each location on the ground from nadir and from 8 oblique angles. Examples of this are shown in FIGS. 2A-2B. This enables photogrammetry post-processing to generate full 3D data. It is very difficult to achieve this desired combination of a very wide field of view and very high magnification, in other words the combination of a wide angle lens and a telephoto lens.

As result, prior art systems often capture a subset of the desired imagery, for example only nadir and perhaps 2 oblique views to the left and right side, and must resort to scanning mirrors or multiple lens and camera systems to achieve even this limited capability.

The focal length needed to achieve the desired survey requirements can be a meter or more in length, which is in the range used by astronomy telescopes. Yet whereas an astronomy telescope with a one degree field of view is considered to have a wide field of view, a survey platform ideally requires at least 90 degrees field of view, at least in one axis. This, coupled with the long focal length needed to achieve high magnification from a large distance together with the needed aperture to achieve the desired optical resolution, imposes significant limits on the capability of existing imaging survey platforms.

Previously, single-sensor (or single film) sensor platforms were able to achieve about 5 cm nadir Ground Sampling Distance (GSD) resolution from an airborne system flying at just 1,500 feet above ground level. This is possible because the magnification focal length required is much smaller at such low altitudes, however it significantly limited the area that could be captured per hour, to about 30 km$^2$ per hour. As result, it would take about 100 hours of flight time, spread over many weeks, to survey a single city.

Various approaches have been used to provide high resolution from higher altitudes. For example, US 20100013927A1 to Nixon uses multiple cameras to capture strips of imagery, U.S. Pat. App. Pub. No. 2020/0106941 A1 rotates a camera system, and U.S. Pat. No. 9,440,750 B2 puts a scanning mirror in front of a camera system, to capture strips of imagery.

These approaches, which typically have a lens focal length of 200 mm to 300 mm, are able to capture 7 cm GSD from 12,000'. This significant increase allows entire cities to be surveyed in one or two days, at around 300 km$^2$ per hour.

However, these systems are insufficient when desiring to survey entire countries or entire continents, as multiple limits restrict platform performance.

As focal length increases for higher resolution and/or higher survey altitude, the physical size of the lens system makes it difficult to package multiple lenses into the sensor platform. The lens system mass also makes it harder to rotate the lens system, as doing so introduces torsional vibrations into the system.

Although scanning mirror systems have been in use for decades, longer focal length systems need more light projected onto the sensor(s), so the mirror is large. As the mirror needs to not move and be vibration free for each exposure onto an array sensor, it is difficult to reduce vibrations during exposure. Such a system needs to move the mirror or mirrors many times a second, further complicating the issue. Longer focal length lenses require more light for the sensors, and so scanning mirror systems require much larger mirrors. The mass of scanning mirrors will go up at least by the square of the radius of the mirror, and this makes it hard to move and stop scanning mirrors quickly without introducing distortion-causing vibrations into the system. Larger scanning mirrors further reduce the light available from a camera sensor hole in an aircraft's hull, further restricting capabilities of the system. As there is a limit to the number of frames per second that a single sensor can capture, this places a limit on the rate that a scanning mirror or moving camera system can capture from a small number of sensors. Furthermore, vibrations created by moving a scanning mirror cause distortions, and this places an upper limit on the rate that a mirror can be accelerated and stopped. Smaller mirrors can be moved faster with less distortions, but provide less light through the lens system, which places limits on the ability to quickly capture imagery. As scanning mirrors need to be at an angle to the camera viewing hole in an aircraft, this also restricts the amount of light available to sensors.

There is also a significant restriction on the size of the view window that an image survey platform must operate through. This is particularly the case with airborne based systems with pressurized hulls, where it is particularly difficult to engineer a large and optically pure viewing window. A typical view window for a pressurized hull is around 30 cm. Even small increases in this size are very difficult to build while maintaining pressure integrity and maintaining optical flatness of the viewing window. The size of the view window limits the optical resolution (e.g., resolvable detail) that can be achieved for a given altitude.

The wider the field of view at long focal lengths, the harder it becomes to build an optical system that is well corrected to achieve the desired resolution and project onto a flat sensor plane. The reason is simply that all wavefront errors scale with the size of the system (e.g., the focal length). While the desired field of view and resolution (e.g. f-number) may be achievable for a 36 mm format camera lens with around 20 mm focal length, a focal length of 1000 mm calls for a wavefront correction that is a factor of 50 better. Hence, as the focal length increases beyond 200 mm, the typical field of view is only a few degrees, and only a few tenths of degrees when the focal length increases beyond one meter. This is a core problem to resolve for sensor platforms, which need both a long focal length in the range from 200 mm to several meters, and also need a very wide field of view, ideally around 90 degrees. FIG. 12 shows this issue, known as Petzval Field Curvature, where the natural focal position for a lens system forms a curved not planar surface.

Longer focal length also significantly increases the size of the optics system, placing size constraints on systems that use multiple cameras and multiple lenses.

An optical system that achieves the desired magnification and field of view is equivalent to a very wide-angle telescope. It also requires a fairly small f/# for a telescopic system (i.e., more light than a typical telescope). From a lens design perspective there a several challenges.

A classical optical system (e.g. rotationally symmetric setup) would be next to impossible. The combination of required field of view and aperture can be found in other wide-angle systems such as wide-angle photo lenses. However, the focal length of wide angle lens systems (in the range of 10 mm to 50 mm) is much shorter than the 200 mm to 20,000 mm required here. A 200 mm to 300 mm focal length is considered a long focal length for existing systems, whereas the invention disclosed herein enables focal lengths of 1,000 mm or more. As mentioned, if the system is scaled up to larger focal lengths compared to existing designs, all wave-front errors are scaled accordingly and would drastically increase the complexity of lens correction. In addition, glass systems would suffer from homogeneity issues of large and thick elements, while large FOV mirror systems have to cope with obstruction from folded beam paths. As a consequence, a classical optical system cannot be employed for this purpose. In addition, the large field of view together with high magnification (long focal length) calls for enormous sensor dimensions far beyond available sensors. As a consequence, current state of the art systems—even for shorter focal lengths—are mostly based on scanning technology where smaller field of view segments are recorded and then combined.

The above issues get much more difficult to address as the focal length and field of view increase, and introduce limitations that restrict the field of view and resolution of existing imaging sensor platforms.

SUMMARY

An imaging survey platform utilizes imaging sensors arranged in one or more arcs to capture nadir and oblique views as required for photogrammetric processing into image maps and 3D surface maps, where a common primary lens subsystem is used by sensors within an arc.

By arranging imaging sensors into arcs, a primary lens subsystem can project onto a curved (e.g., spherical) surface rather than onto a planar surface. This solves a limiting first order optical problem for airborne or spaceborne image capture. To fill missing data between sensors edges on an arc, a second and offset arc of sensors or a scanning mirror in front of the primary mirror system can be used. Each imaging sensor can be mounted on and controlled by its own computer, with this subsystem in turn may be mounted onto the arc using piezoelectric actuators to fine tune alignment image sensor relative to the primary lens subsystem. The use of a large number of imaging sensors enables high speed capture and parallel storage of data. A scanning mirror can be used in front of the primary lens sub-system to enable a smaller arc capture of a large field of view. To eliminate forward motion blur during image capture, a scanning mirror is rotated in the pitch axis, or piezoelectric actuators rotate the primary mirror subsystem and sensor arcs subsystem relative to one another. Multiple arcs can be used to capture obliques in nadir, forward and rearward facing views.

BRIEF DESCRIPTION OF THE DRAWINGS

The Figures, in which there is shown one or more of the multiple embodiments of the present disclosure, will be better understood when read in conjunction with the detailed descriptions. It should be understood, however, that the various embodiments of the present disclosure are not limited to the precise arrangements and instrumentalities shown in the figures.

In the Figures.

DETAILED DESCRIPTION

Figure 1:
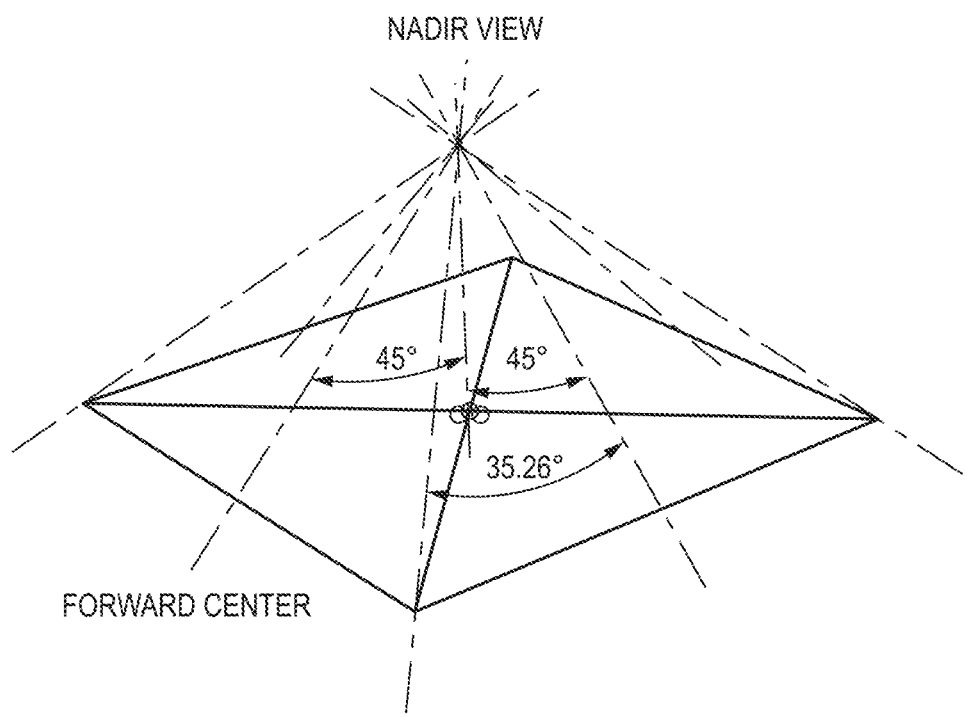
FIG. 1 shows desired view angles from an aircraft or spacecraft based imaging survey platform.
Figure 2A:
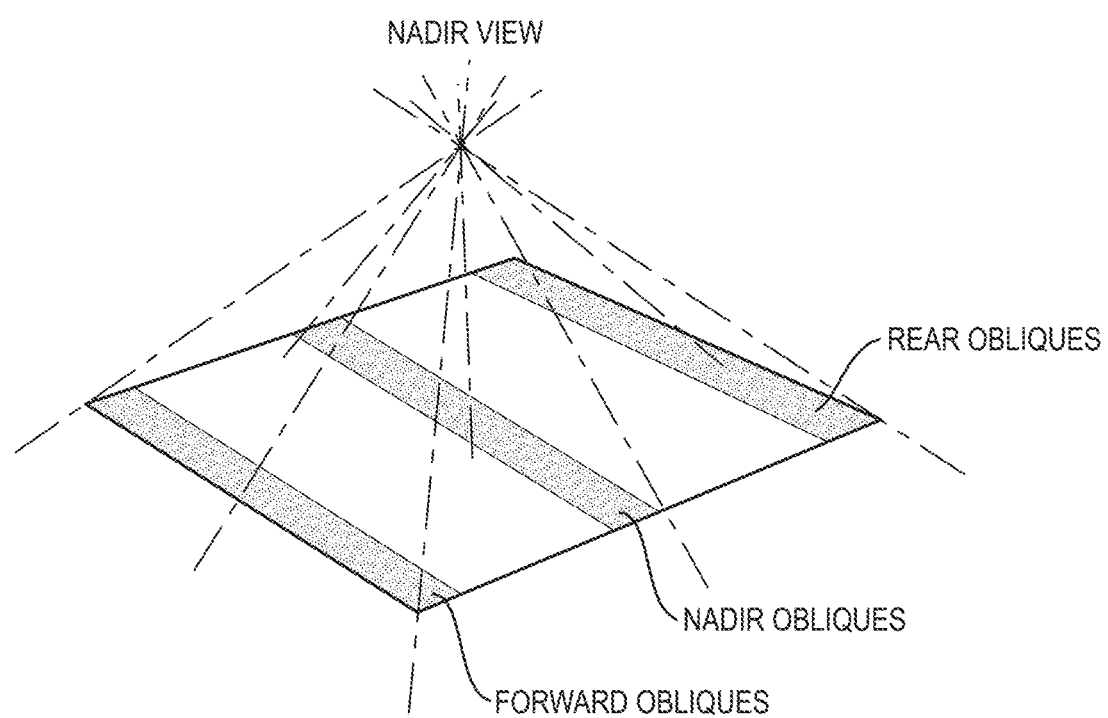
FIGS. 2A-2B show desired 3 strips to capture to achieve Nadir and 8 oblique views of points on the ground.
Figure 2B:
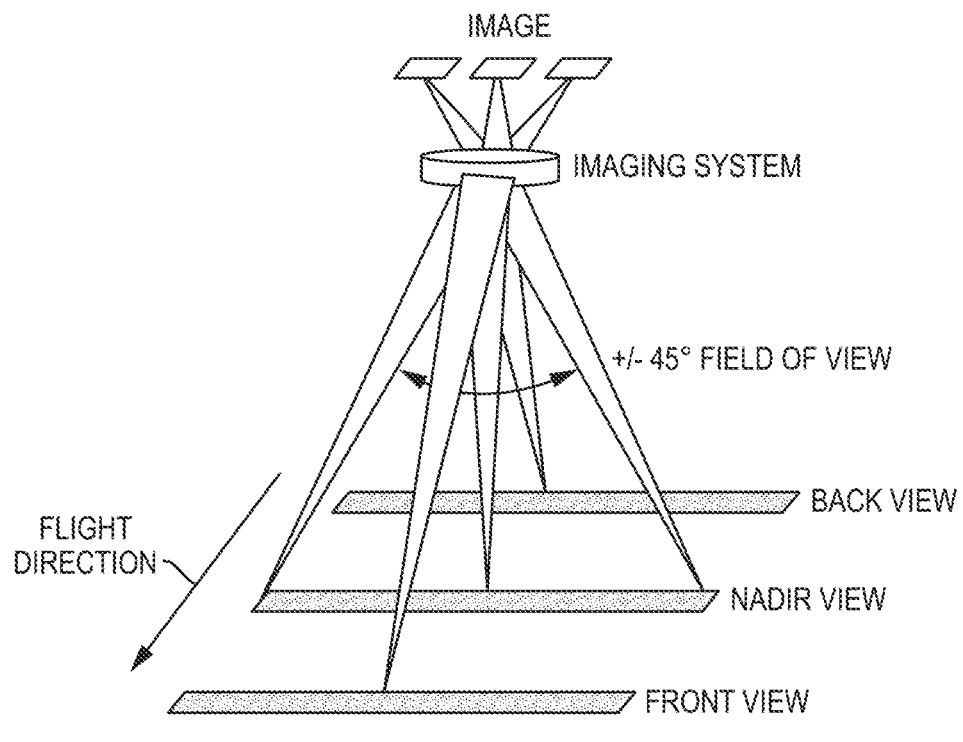

Certain embodiments of the present invention are designed to survey very large areas (e.g., at a rate of at least ten million km² per year) in very high resolution (e.g., ≤5 cm), including imaging multiple oblique views (such as 8 obliques as well as Nadir) that enable creation of high quality 3D data using photogrammetry processes.

Embodiments of the present invention may be implemented in aircraft or spacecraft platforms. The term "flight direction," as used herein, refers to the direction that the aircraft is flying or that the spacecraft is orbiting.

One embodiment, for example, is able to survey entire continents of imagery, including obliques, every few months at high resolution (e.g., anywhere in the range of 2 cm to 5 cm ground resolution pixels), using aircraft flying at high altitude (such as over 43,000 feet, to avoid interfering with commercial jet air traffic). Such embodiments implement survey rates in the order of 10,000 km² per aircraft per hour, which is more than an order of magnitude faster than current systems can achieve.

In order to achieve high survey rates, aircraft used in embodiments of the present invention may fly at high altitude, in order maximize the area that can be captured per hour for a given field of view. Furthermore, air traffic control typically greatly restricts on-survey time. Such restrictions may require the system to be implemented in a high altitude aircraft, flying at very high altitude (e.g., above 45,000 feet), so that commercial air traffic does not interfere with the survey work. Flying at lower altitude, such as 35,000 feet, would mean that the survey work is constantly interrupted due to constant commercial traffic at those altitudes, as it is common to have many hundreds or thousands of aircraft airborne over a continent at the same time and flying below 45,000 feet.

It is desirable to capture imagery at the highest resolution possible. Embodiments of the present invention may be designed to capture least 5 cm nadir GSD resolution, and higher resolutions are possible (e.g., ≤4 cm, ≤3 cm, ≤2 cm, and ≤1 cm), although achieving some resolutions may require increasing the size of the viewing window. It is further desirable to capture multiple oblique views at about 45 degrees, to enable good 3D reconstruction of the viewed terrace surface. Embodiments of the present invention may be designed, for example, to capture at least 8 oblique views, which ensures very good photogrammetric processing accuracy and 3D model generation.

When installed into the pressure hull of an aircraft such as the Bombardier Global, embodiments of the present invention may capture 28,000 km² or more per hour per aircraft, of which 10,000 km² or more per hour per aircraft may be non-overlapped survey area. This enables two aircraft with 5 hours of on-survey time each to perform at least 100,000 km² of survey work per day, which is sufficient to survey an area the size of the European Union 5 times per year with just two aircraft. These particular areas and rates are merely examples and do not constitute limitations of the present invention.

The capture rate described above is at least 10 times higher than existing systems, while providing at least 200% higher resolution and also providing views of the ground from 8 view angles as well as from overhead. This represents a substantial improvement on existing state of the art image survey platform capabilities.

Other embodiments are also possible, including spaceborne and lower altitude platforms, which also offer improvements over the state of the art in those respective areas.

Embodiments of the present invention may be designed to capture high resolution of 5 cm or better at nadir and to capture 45 degree obliques from up to 8 angles to enable good creation of 3D surface data. To achieve this, the system may, for example, image three strips of the ground, at −45, 0 and +45 degrees pitch, and from +45 degrees to −45 degrees in the roll axis, with a 1000 mm focal length. Because the sensor platform is moving forward, it will be understood that these three strips are sufficient to capture all desired oblique views and the nadir. If flight lines are spaced 10 km apart, this achieves 175% overlap and a maximum of 20 degrees off-nadir overhead views, which is a good balance to achieve high photogrammetric accuracy and good overhead map views.

It will be understood that subset versions of this system can be built that offer lesser capabilities, using the principles disclosed herein. For example, a system could capture only one strip, and to only +35/−35 degrees on the 0 pitch angle. This would be sufficient for more limited survey capabilities with only 2.5D (not 3D) surface calculation. The system could also use longer or shorter focal lengths to achieve different survey resolutions. For spaceborne applications, a focal length of at least 10 meters is desirable and for high altitude 45,000 foot aircraft survey work, a focal length of around 1 meter is desirable, and for smaller embodiments designed to replace inferior prior-art solutions for low 2,000 foot to medium 15,000 foot altitude, a focal length of around 200 mm to 300 mm is desirable.

Whereas state of the art sensor platforms might use 200 mm or 300 mm focal length, to capture about 7 cm nadir pixels from 12,000 feet, embodiments of the present invention may use a focal length of at least 1,000 mm in order to achieve 5 cm or better nadir pixels from 45,000 feet. To maintain resolution and light availability for a similar sensor the aperture needs to scale accordingly, so be about 2-4 times as large.

One could imagine a planar sensor strip imaged via a 1000 mm focal length lens system. Such a sensor would be 2000 mm wide, by perhaps 4 cm deep along the direction of flight. Such a sensor is completely impractical for two reasons. First, a state of the art very large sensor might measure several centimeters in length, not meters in length. Second, the greater the field of view for a long focal length system, the harder it is for an imaging lens system to focus the resulting image onto flat plane due to, among other things, the Petzval Field Curvature issue. At focal lengths of 1000 mm, it becomes very hard to achieve more than a few degrees of field of view; much less than the 90 degrees field of view desired to achieve the objectives met by this invention.

Embodiments of the present invention address these two key issues, as well as other problems, to enable very wide field of view and long focal length, as follows.

Instead of having one or more image sensors (also referred to herein as "imaging sensors") on a flat planar surface, a key novel aspect of embodiments of the present invention is to arrange sensors into one or more sensor imaging arcs, not planes, of desired length. Some or all of the image sensors in the arc(s) may, however, themselves be flat (i.e., have flat surfaces onto which the primary lens subsystem projects light). An image sensor implemented according to embodiments of the present invention is referred to as "flat" if it is flat within usual sensor manufacturing limits. As this implies, an image sensor may be considered to be "flat" according to embodiments of the present invention even if it is not completely flat.

Figure 3:
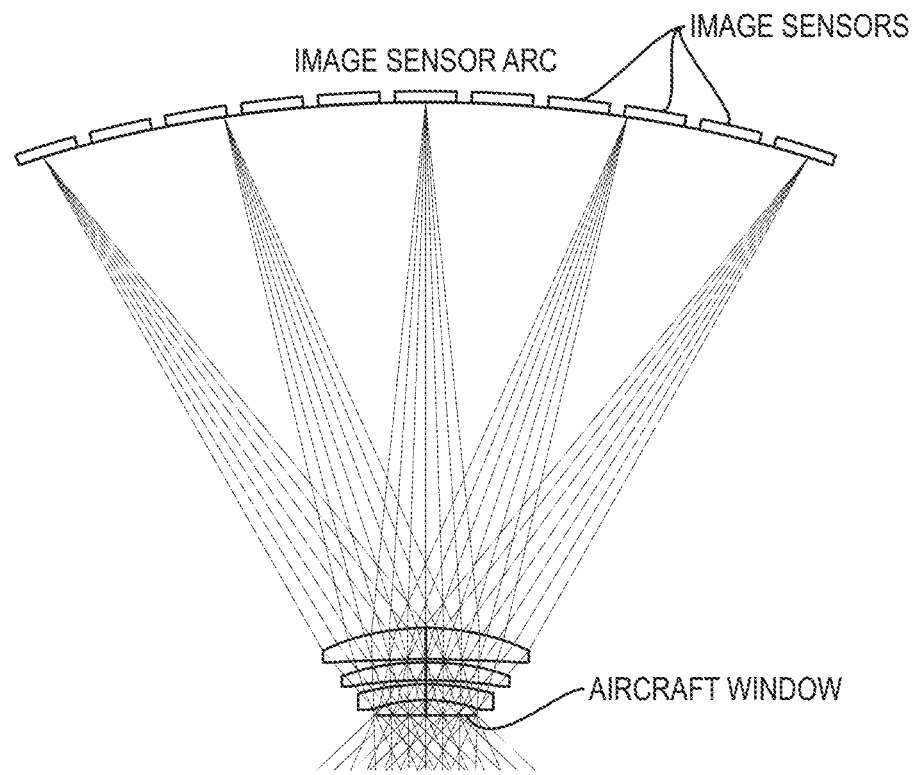
FIG. 3 shows imaging sensors arranged in an arc from a sphere rather than on flat plane surface.

A general example of this approach is shown in FIG. 3, which shows light entering an aircraft window (which is an example of a "viewing hole," as that term is used herein). The primary lens subsystem is located within the aircraft, behind the aircraft window, such that the light entering the aircraft window hits the front of the primary lens subsystem, and is projected thereby onto a plurality of image sensors arranged in an arc. Some or all of the plurality of image sensors in FIG. 3 may, for example, be flat.

In such an arrangement, for example, a 1000 mm focal length system with +45/−45 oblique view has a 90 degree field of view, so the arc could be 1000 mm*pi/4=1571 mm in length in this example. The arc curvature and length is closely related to the desired focal length and arc field of view for the system. If one assumes a monocentric system which reduces field aberrations, the arc length is simply given by FocalLengthmm*2*pi*(ArcFieldOfViewdegrees/360). While other designs can have different field curvature this is a useful starting point. So a system with 1200 mm focal length and 60 degree arc field of view would have an arc length of 1200*2*pi*(60/360)=1256.6 mm.

Figure 13A:
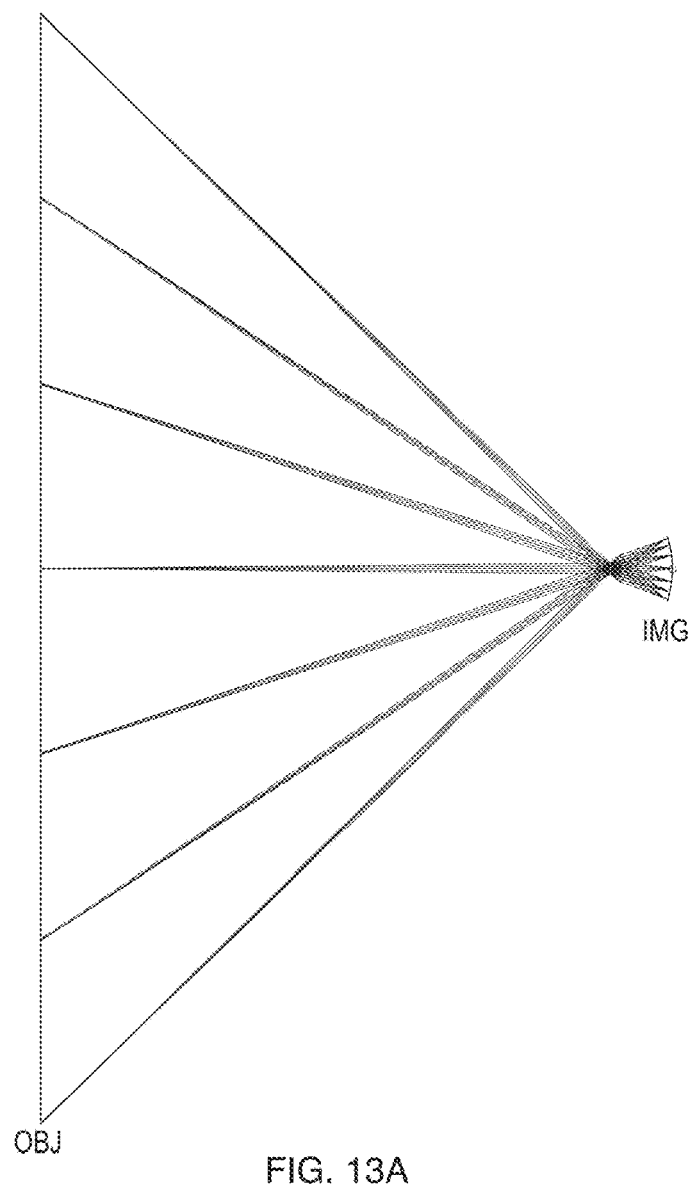
FIGS. 13A-13B shows a lens design taking advantage of the natural curved field offset, and projecting on to a curved imaging surface.
Figure 13B:
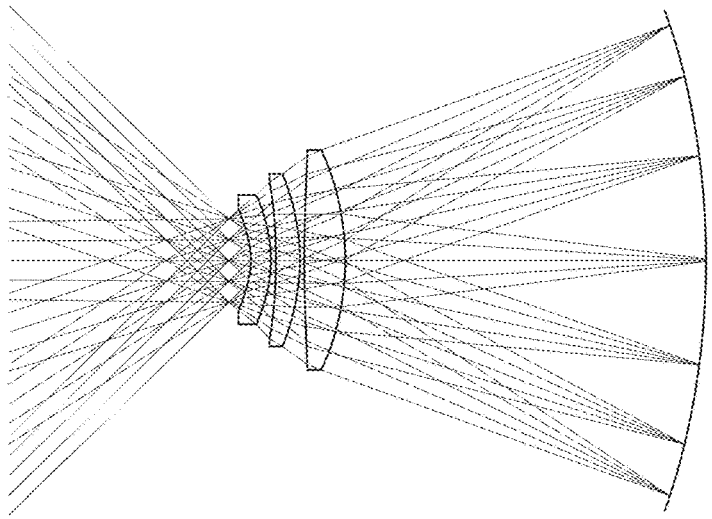
Figure 14:
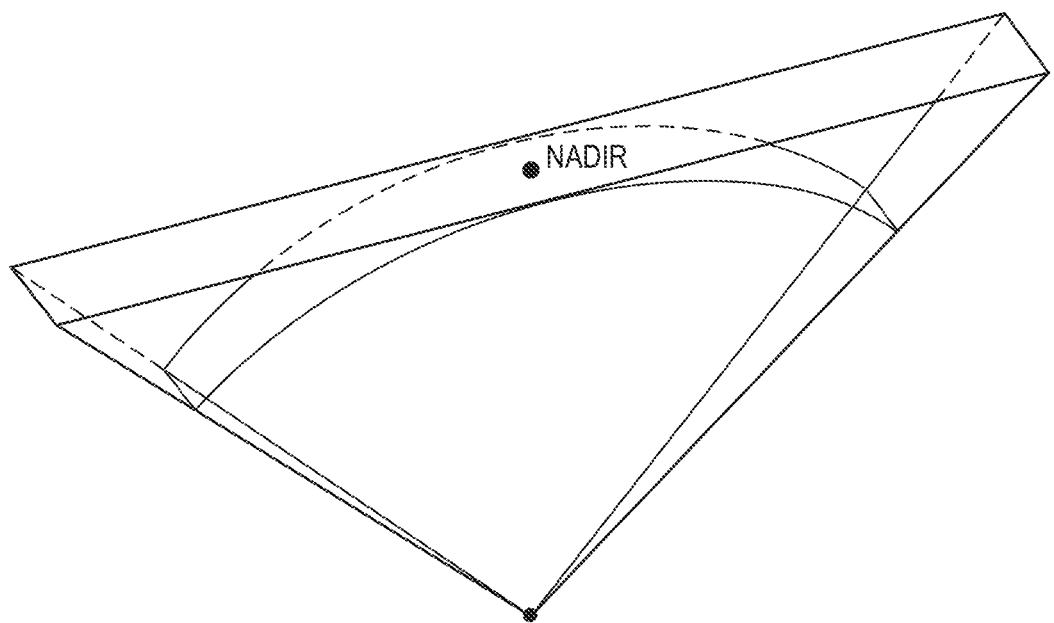
FIG. 14 shows a two image sensor surfaces, one being a rectangular surface using a planar image sensor surface, and the other being an arc surface using a curved (e.g., spherical) image sensor surface.

By projecting onto an arc instead of projecting onto a plane, the sensor platform's primary lens subsystem does not have to correct for this first order distortion. This makes it possible to have very large field of view of 90 degrees or more and long focal length of meters or more, as the optical design constraint of a flat sensor plane has been removed. FIGS. 13A-13B shows a lens design taking advantage of the natural curved field offset, and projecting an image from the left of the FIG. 13B on to a curved imaging surface to a curved sensor surface on the right of the FIG. 14 shows two image sensor surfaces, one being a rectangular surface using a planar image sensor surface, and the other being an arc surface using a curved (e.g., spherical) image sensor surface.

In order to form the desired arc based sensor, embodiments of the present invention may take advantage of the fact that the curvature is low, due to the long focal length, and thus can be approximated by many small (possibly flat) sensors to form the arc, as the difference for each sensor from the ideal arc position will be in the order of microns, which is small enough to not present a defocus problem.

By analogy, it can be seen that this approach is much like using many small lines to approximate an arc. If the lines are small and the arc is large, the result is close to the desired perfect arc. Because the arc length is large relative to the sensor size, multiple sensors approximate an ideal arc. This means that the distance of a sensor pixel from the ideal arc is not large, and so defocus is not a significant issue. Typically, a single arc may, for example, have 10 to 200 imaging sensors along the arc, and the number of sensors used depends on the size of each sensor, the length of the arc, the desired defocus tolerances, and whether scanning mirrors are also used in front of the primary lens subsystem. As discussed in the quantification section below, these are embodiment parameters that can be tuned to optimize for a specific application. This works best for focal lengths over 200 mm, (with typical camera sensors of several 10 mm in size) and gets even better as the focal length increases beyond this, which is a highly desirable attribute of embodiments of the present invention.

Because embodiments of the present invention use multiple sensors to form an arc, each sensor has a low frame rate requirement. One result of this is that it is possible to increase the dwell time per capture event, which in turn increases the total amount of light being captured by sensor, and so can be used as a way to reduce the size of the viewing window. Although this would impact resolution, it results in a better signal-to-noise ratio.

Figure 4A:
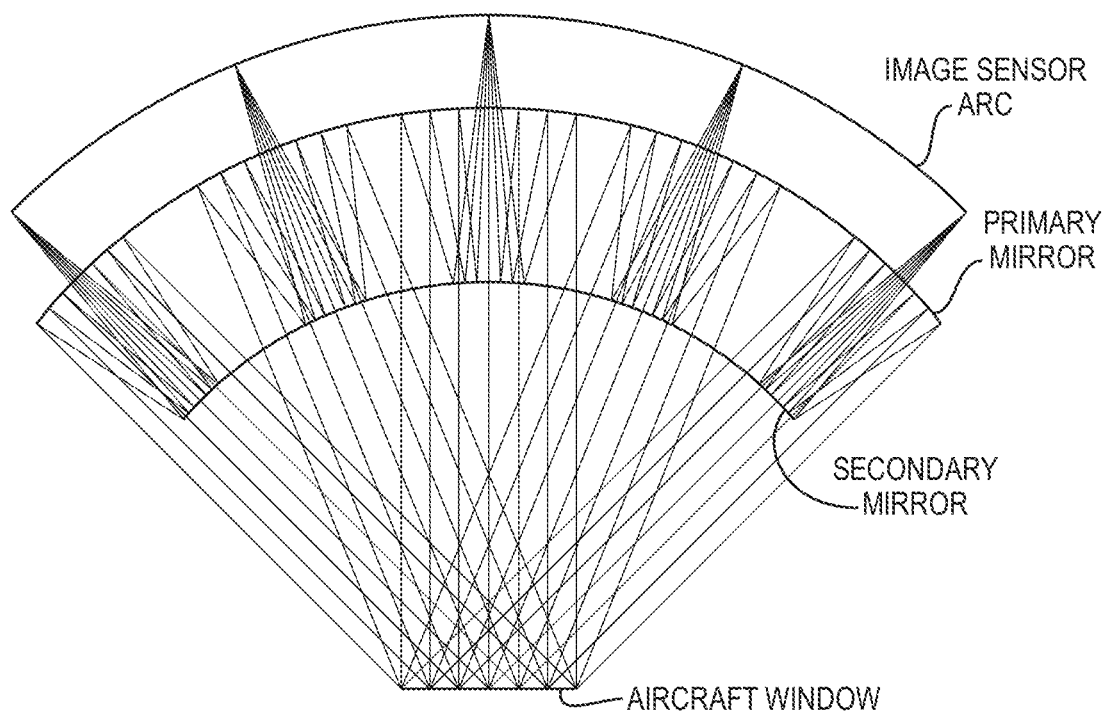
FIGS. 4A-4D show some of the various ways to implement primary lens subsystems that can achieve the desired sensor arc, being Catadioptric, Stop at Center, Monocentric, and Stop at Front primary lens subsystems.
Figure 4B:
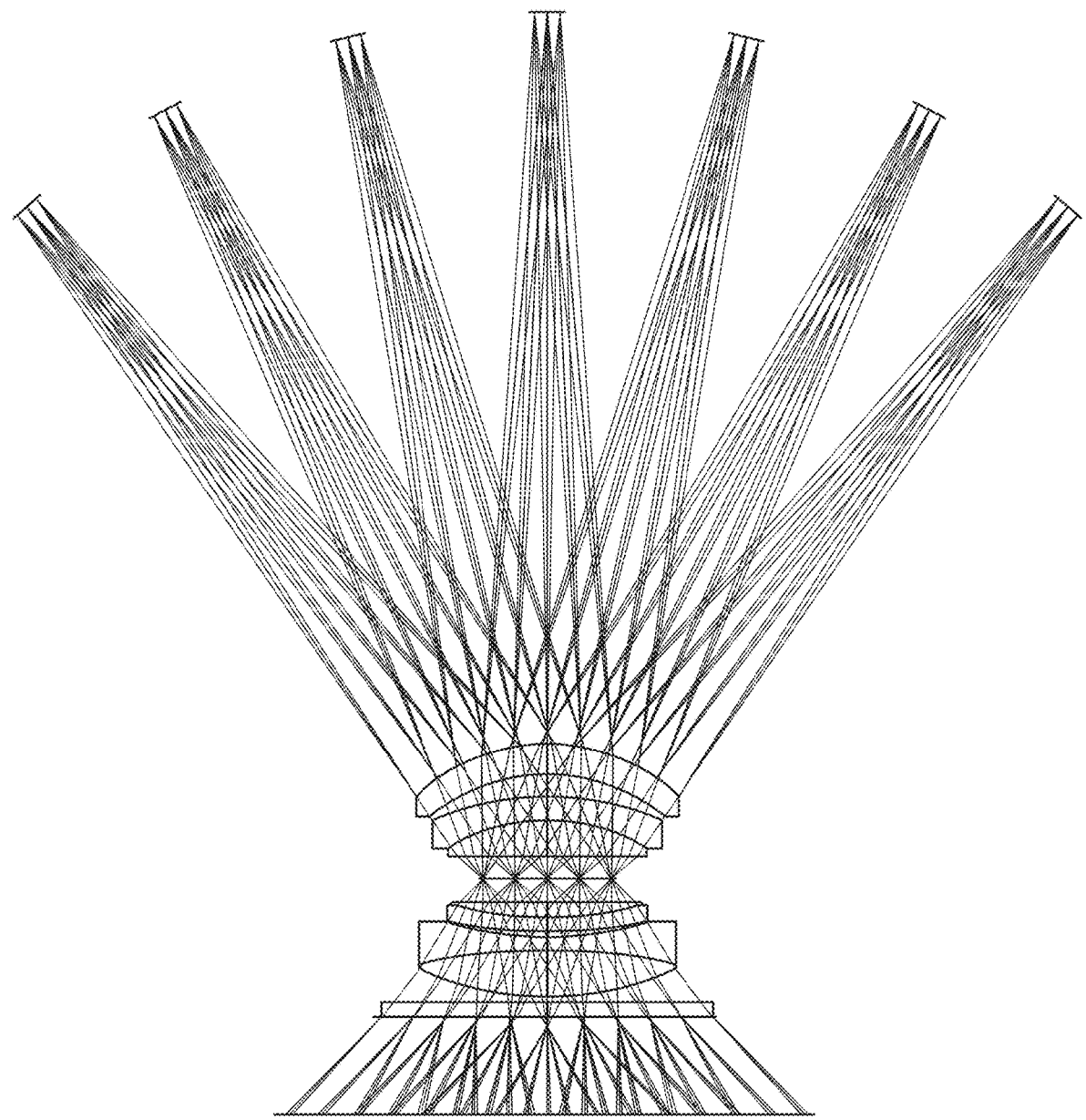
Figure 4C:
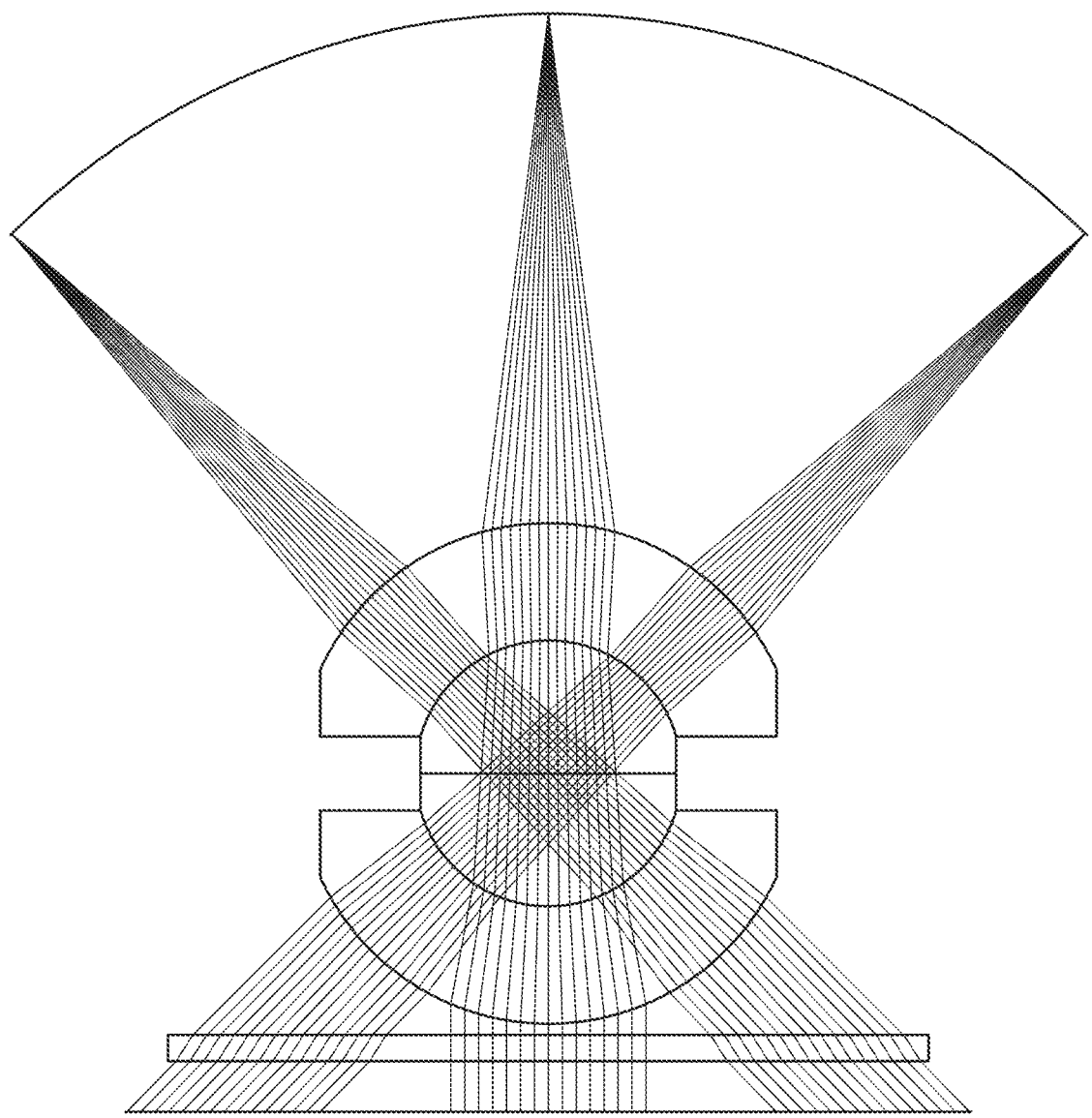
Figure 4D:
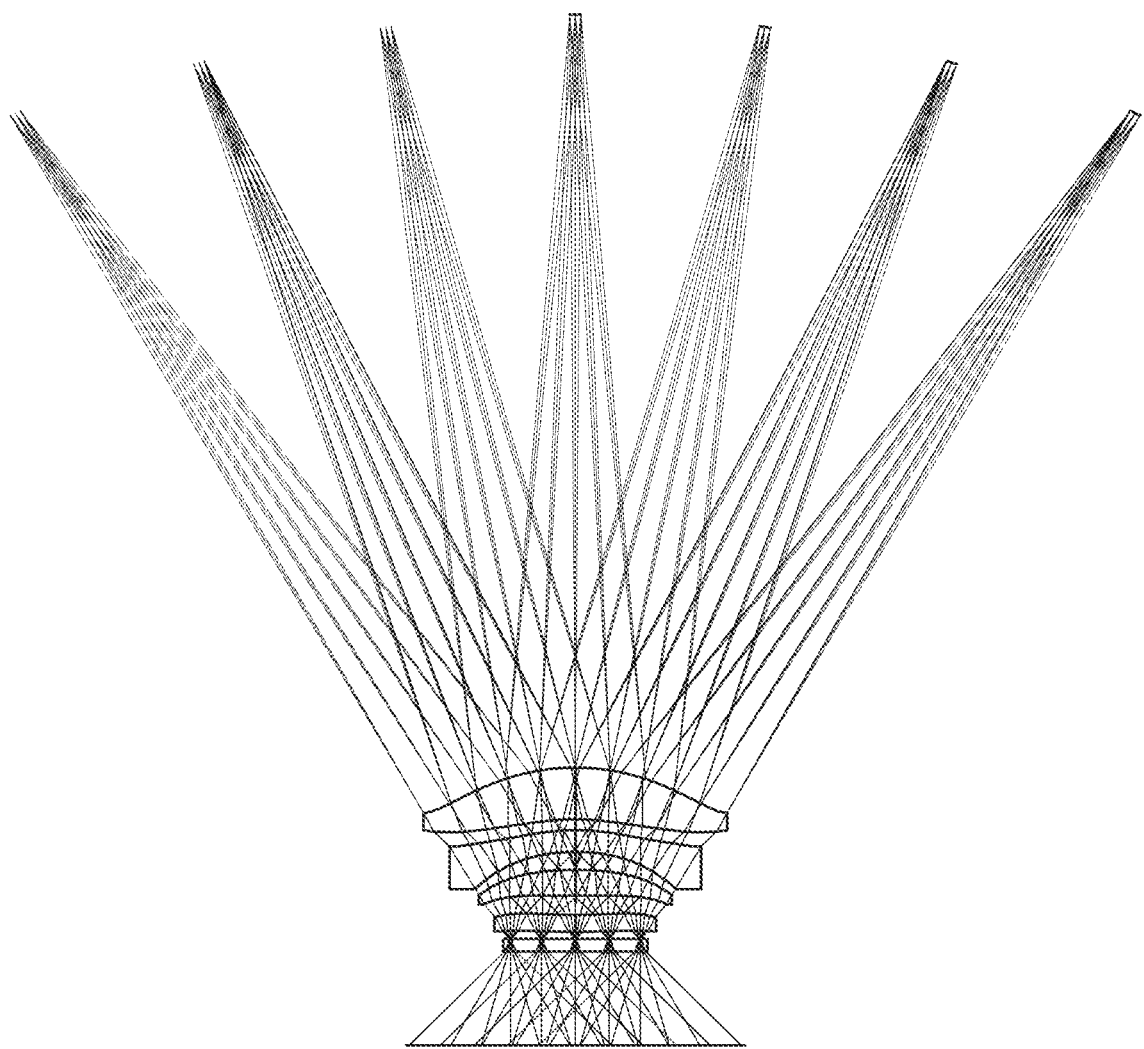
Figure 9A:
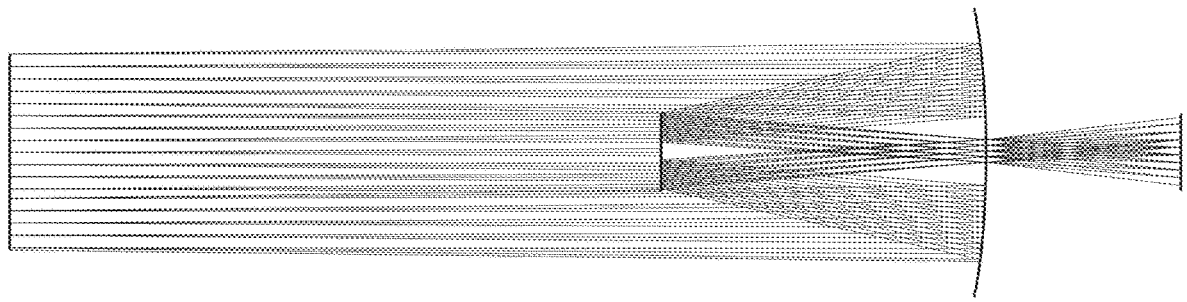
FIGS. 9A-9C show three example embodiments for a system based on Catadioptric primary lens subsystem, showing how sensors and secondary mirrors can be placed in different positions.
Figure 9B:
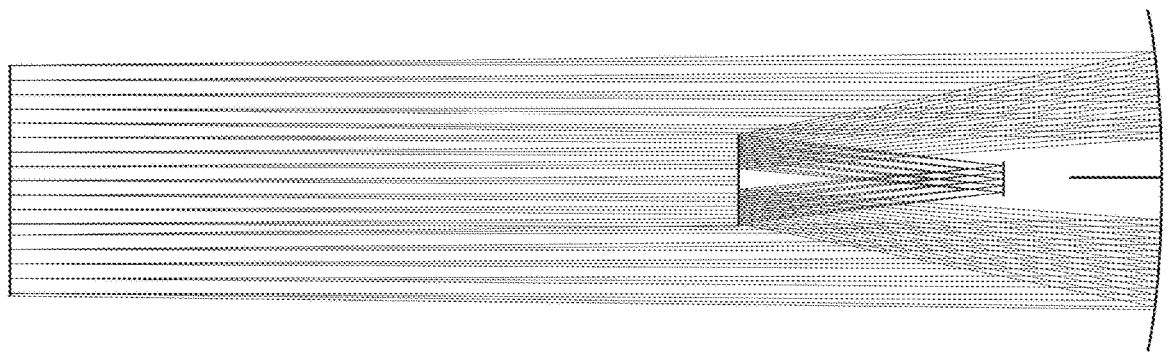
Figure 9C:
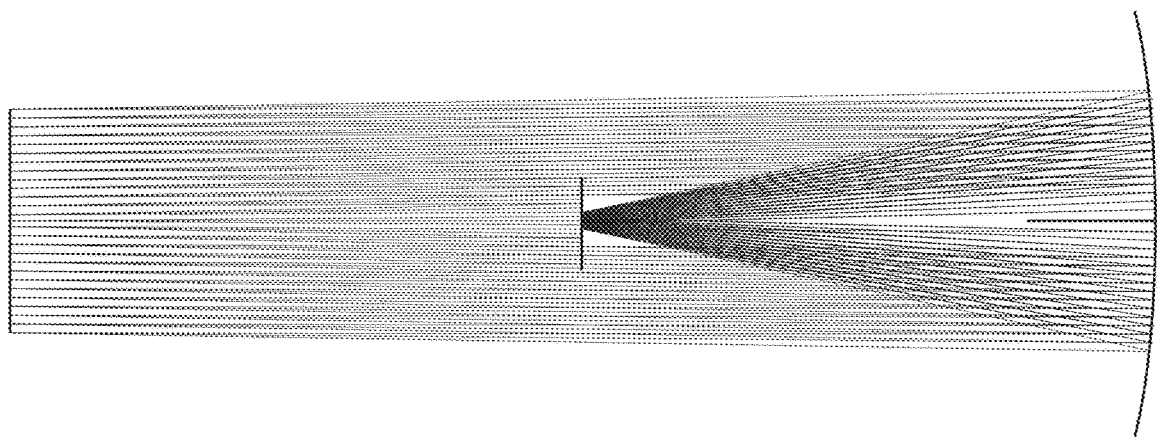

It will be understood that there are many optical solutions that can create a primary lens subsystem that projects the imagery onto a portion of a sphere in the form of an arc instead of onto a flat surface. Possible primary lens subsystem approaches include monocentric refractive lens, stop in front refractive lens, stop in center refractive lens and various other refractive, reflective and catadioptric lens designs. Each of these offers different advantages and disadvantages, and it will be understood that the invention is not restricted to a particular primary lens subsystem. Examples of some of these ways to implement primary lens subsystems are shown in FIGS. 4A-4D, namely: catadioptric (FIG. 4A), stop at center (FIG. 4B), monocentric (FIG. 4C), and stop at front primary lens (FIG. 4D). FIGS. 9A-9C show three example embodiments for a system based on Catadioptric primary lens subsystem, showing how sensors and secondary mirrors can be placed in different positions. The use of the term "lens" in "primary lens subsystem" does not imply that the primary lens subsystem is limited to including lenses. More generally, primary lens subsystems implemented according to embodiments of the present invention may include components in addition to and/or instead of lenses, such as one or more mirrors, for performing the functions disclosed herein.

Further, it will be understood that an unusual feature of embodiments of the present invention is that the viewing hole (shown, for example, in FIGS. 3 and 4A as the "aircraft window," which is an example of a viewing hole) in the aircraft or spacecraft can be smaller than the primary lens subsystem (i.e., the width of the viewing hole may be smaller than the width of the primary lens subsystem), and that light rays entering each individual sensor uses only a subset of the entire primary lens subsystem. One unusual aspect of some embodiments of the present invention is that the aperture stop is also the entrance pupil and located at or near the viewing hole. Such embodiments are advantageous, in terms of resolution and available light, to prior art camera systems, which typically have the aperture stop between other optical elements.

Figure 7A:
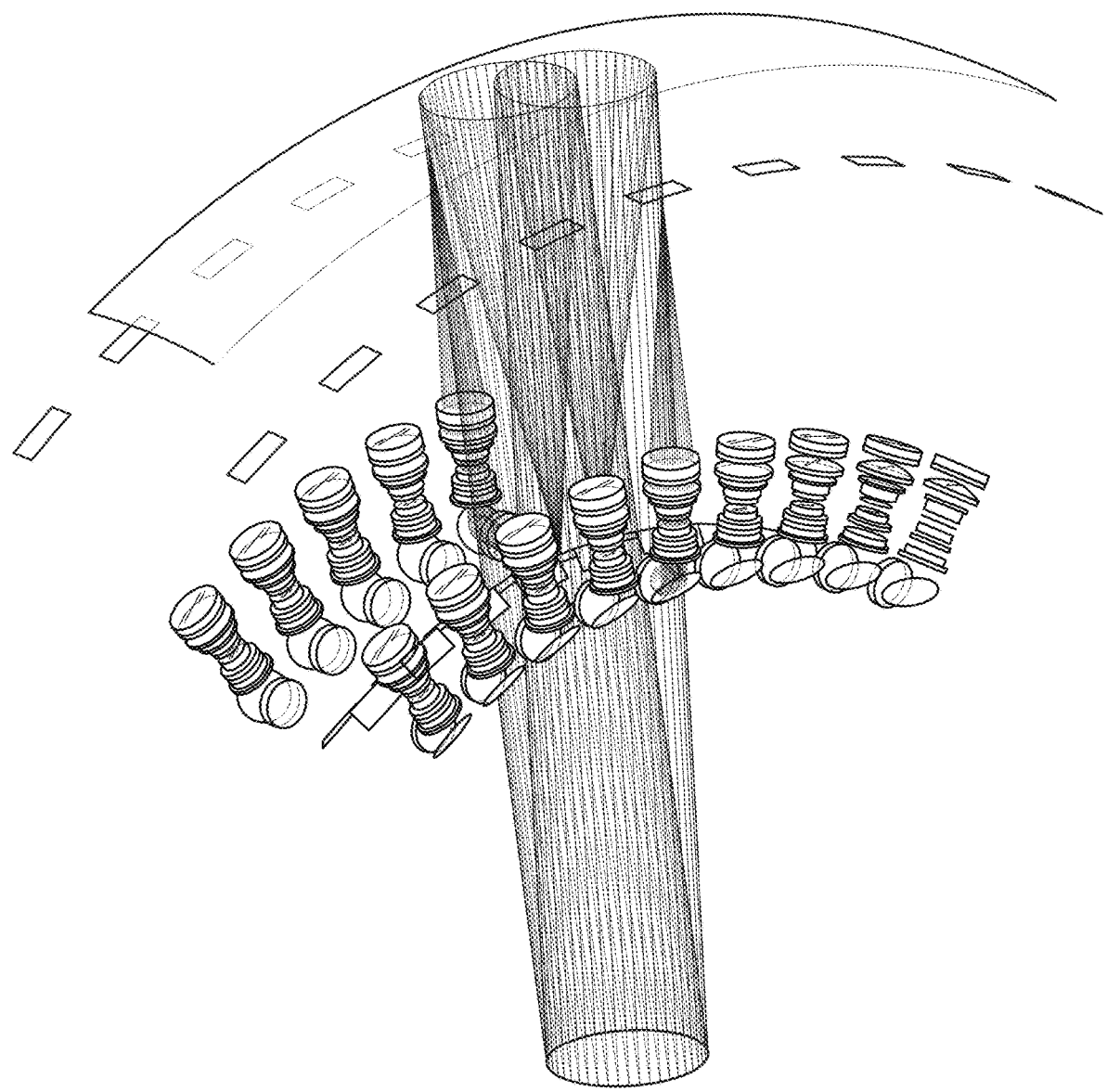
FIGS. 7A-7B show how individual sensors only use an overlapping but subset portion of the primary lens subsystem for the light path to each sensor, with the light path into two sensors being shown in 7A where the light paths overlap and 7B where the light paths do not overlap on the primary lens subsystem.
Figure 7B:
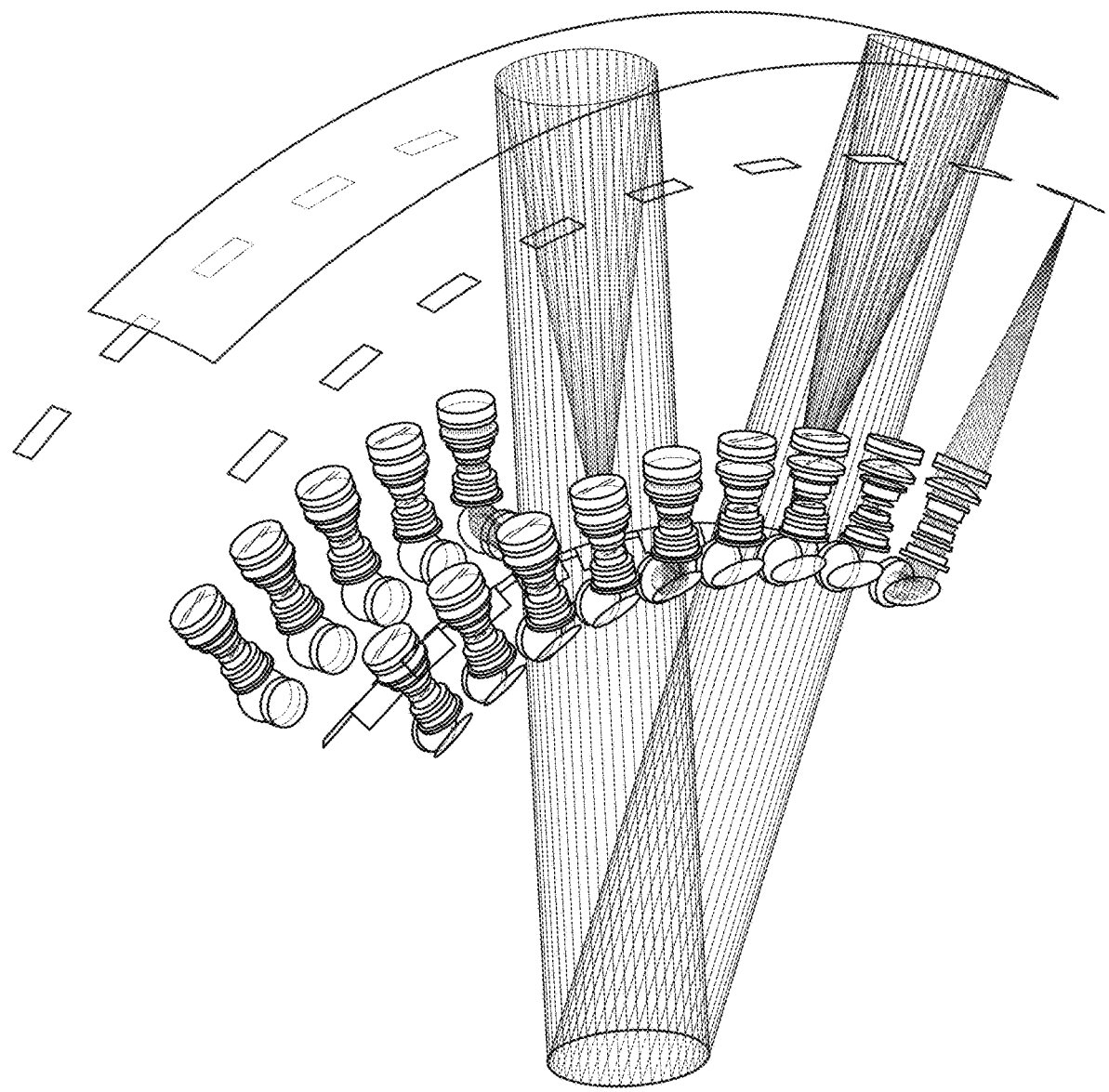

In other words, each sensor may use only a portion of the primary lens subsystem light paths, and this portion overlaps with neighboring sensors use of the primary lens subsystem. FIGS. 7A-7B show how individual sensors only use an overlapping but subset portion of the primary lens subsystem the light path to each sensor, with the light path into two sensors being shown in 7A where the light paths overlap and 7B where the light paths do not overlap on the primary lens subsystem.

Because each sensor only sees a portion of the primary lens (but shared with its neighbor sensors), only the portion of the primary lens seen by a sensor must be in precise optical alignment relative to that sensor. As result, the system has far greater tolerance to misalignment than a classic optical system of this size would have, and can tolerate errors exceeding multiple wavelengths of light across the primary lens (e.g., mirror), which would normally be unacceptable This means that adaptive optics can be used to adjust the primary lens subsystem, such as a mirror, without needing the entire primary lens to be in common alignment. It also makes it practical to use individual sub-mirrors to make up the primary mirror lens subsystem, with the sub-mirrors aligned into a single logical primary mirror.

As detailed below, one embodiment uses a refractive mirror for the primary lens subsystem combined with per-sensor image relay lenses, although this is not a requirement for the system, as alternative approaches such as spherical secondary mirrors could be used instead to project onto the sensor.

A mirror based primary lens is lighter than a refractive lens design and does not suffer from chromatic aberrations that are inherent to a refractive lens design. This embodiment has the desirable feature of placing the optical stop at the center of curvature of the spherical mirror. In doing so, we have the same optical conditions for any viewing angle. This is exactly true if both object (ground) and image are also on arcs concentric to the optical stop (which is our window). As we are imaging closely to infinity, the arc for the object (ground) is practically irrelevant. The design ensures there are no off-axis aberrations but only spherical aberration from the mirror. The lower mass of a mirror based system is also important in spaceborne and airborne sensor platforms, where mass is at a premium.

Because each sensor only sees a portion of the primary mirror (which does however overlap with neighboring sensors), and because the imaging arc is wider than it is long, the primary mirror can also be in the form of an arc.

As the aperture stop of the primary mirror is located in front of the mirror, the aperture stop may be placed near (or at) the aircraft window in order to maximize the aperture size and hence resolution and light collection.

The primary mirror for each arc can be made from multiple sub-segment mirrors, aligned with actuators to form the total mirror surface.

Sub-segment mirrors could be part of the arc, or square mirrors, or hexagonal segments, or other any other approach that results in the desired final arc mirror.

Unlike most telescopes which use a parabolic primary mirror, we use a spherical primary lens surface. Per-sensor image relay subsystems are used to clean up remaining spherical and defocus aberrations.

Use of a spherical shaped primary mirror makes it easier to build each mirror arc from sub-mirror units, as each sub-mirror unit is itself a spherical mirror surface (and not a complex sub portion part of a parabola, as would be the case with a typical telescope system).

This is useful, because a spherical surface mirror of this size would be very large and very hard to manufacture, as well as being sensitive to temperature and mounting variations that would distort the mirror surface from the ideal spherical surface.

The primary mirror can thus be divided up into mirror segments, for example square segments or octagonal segments, that when collectively mounted into an arc, form the desired primary mirror spherical reflective surface. It will be understood that each mirror segment still has a spherical surface, so that this method simply cuts up the larger mirror arc into smaller arcs segments.

The primary mirror surface, possibly consisting of multiple smaller mirror segments, needs to be brought into spherical alignment, which can be achieved using piezoelectric actuators that mount and adjust each mirror segment. An important feature of the system is that because each image sensor only observes the scene using a small number of the mirror segments, it is a much simpler problem than a full adaptive mirror system as used by large telescope systems, where all of the mirrors must be brought into perfect alignment. Furthermore, we only need to bring the system into static alignment, perhaps with occasional tuning to adjust for temperature changes, whereas large adaptive telescope systems adjust many times per second to adjust for atmospheric effects.

It would be possible to use a secondary mirror system with a spherical surface to reflect the image on to the individual sensors, which will also reduce the focus variation inherent in a design with a spherical primary mirror. However, such a system is hard to make, as the secondary spherical mirror would need to be in exact alignment with the primary mirror system.

Mirror based telescopes often use a parabolic surface primary mirror instead of a spherical surface primary mirror, as a parabolic does not suffer from the defocus smear (most notably spherical aberration) common with a spherical primary mirror. However, for embodiments of the present invention, a spherical surface primary mirror can be used for most embodiments. This is because, unlike a conventional telescope, where light reflects from all points on the primary mirror onto a given sensor point, each sensor in this invention (and thus each point on each sensor) only "sees" less than the total surface of the primary mirror, and typically substantially less. For example, if the focal length is 1,000 mm and the field of view is 90 degrees, with viewing window diameter of 300 mm in a pressurized aircraft hull, each sensor would only gather light from about 20% of the primary mirror. As result, removal of significant defocus blur caused by the primary mirror can be corrected using secondary image relay lenses and/or curved secondary mirrors. Use of a spherical surfaced primary mirror makes many other design aspects much simpler, as it is easier to make a large spherical surface, especially when the mirror is made up from multiple mirror elements.

So it is not strictly necessary to use a spherical surface primary mirror, and parabolic shaped primary mirrors for arcs could be used for embodiments of the present invention. However, use of a parabolic primary mirror would require each image relay subsystem to be have different optics for each sensor, and would make it much more complex to manufacture, build and align the primary mirror system, especially if the arc's primary mirror is built up from multiple mirror segments. This might offer advantages for applications where cost of the sensor platform is not important, however for most applications a spherical shared primary mirror is a better solution.

It is also possible for the curved sensor array to follow a non-spherical curve, for example if a parabolic curve is used for the primary surface mirror. However, this again significantly adds to complexity of design and implementation costs, and so for many applications the curved sensor array will be in the form of a spherical arc.

Figure 5A:
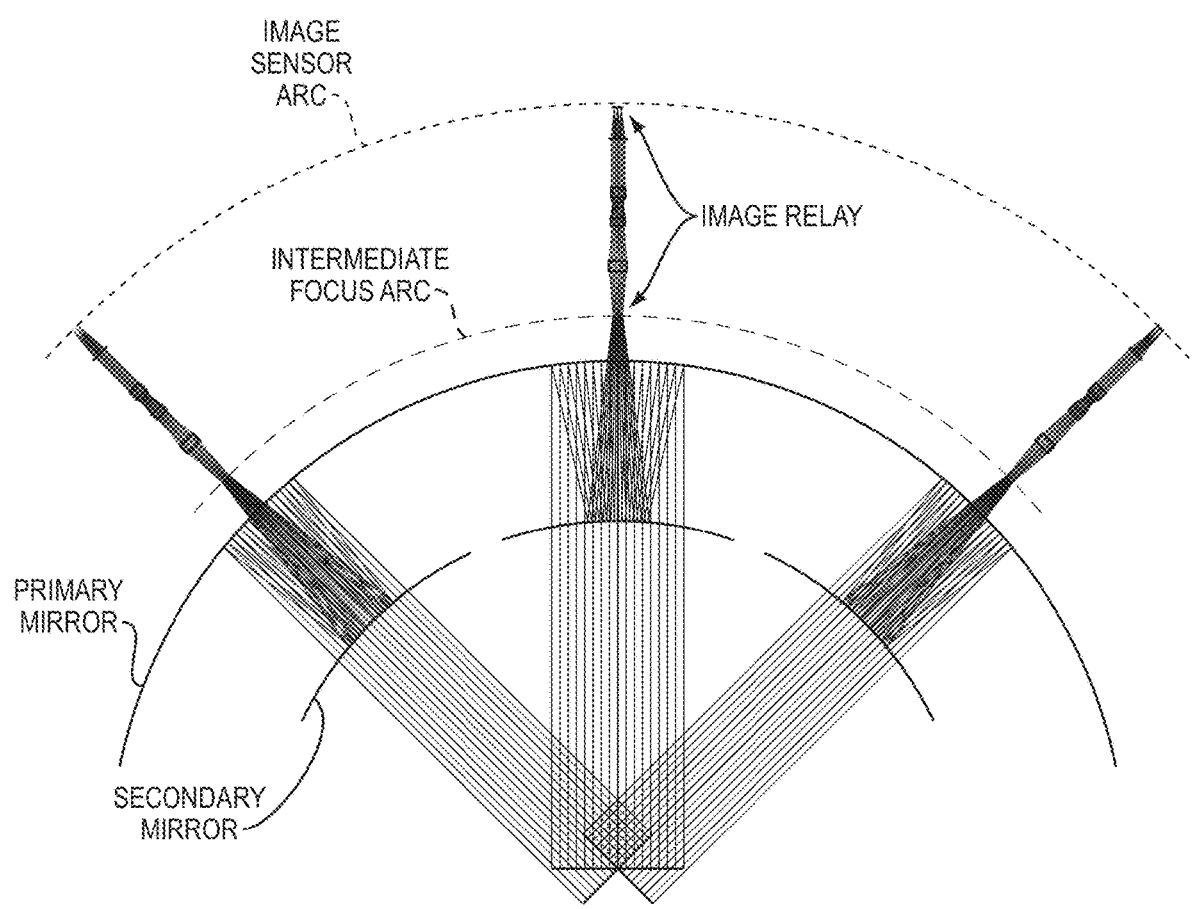
FIGS. 5A-5B show the optional use of per-sensor image relay lens subsystems, for Catadioptric primary lens subsystem and for a Stop in Front primary lens subsystem.
Figure 5B:
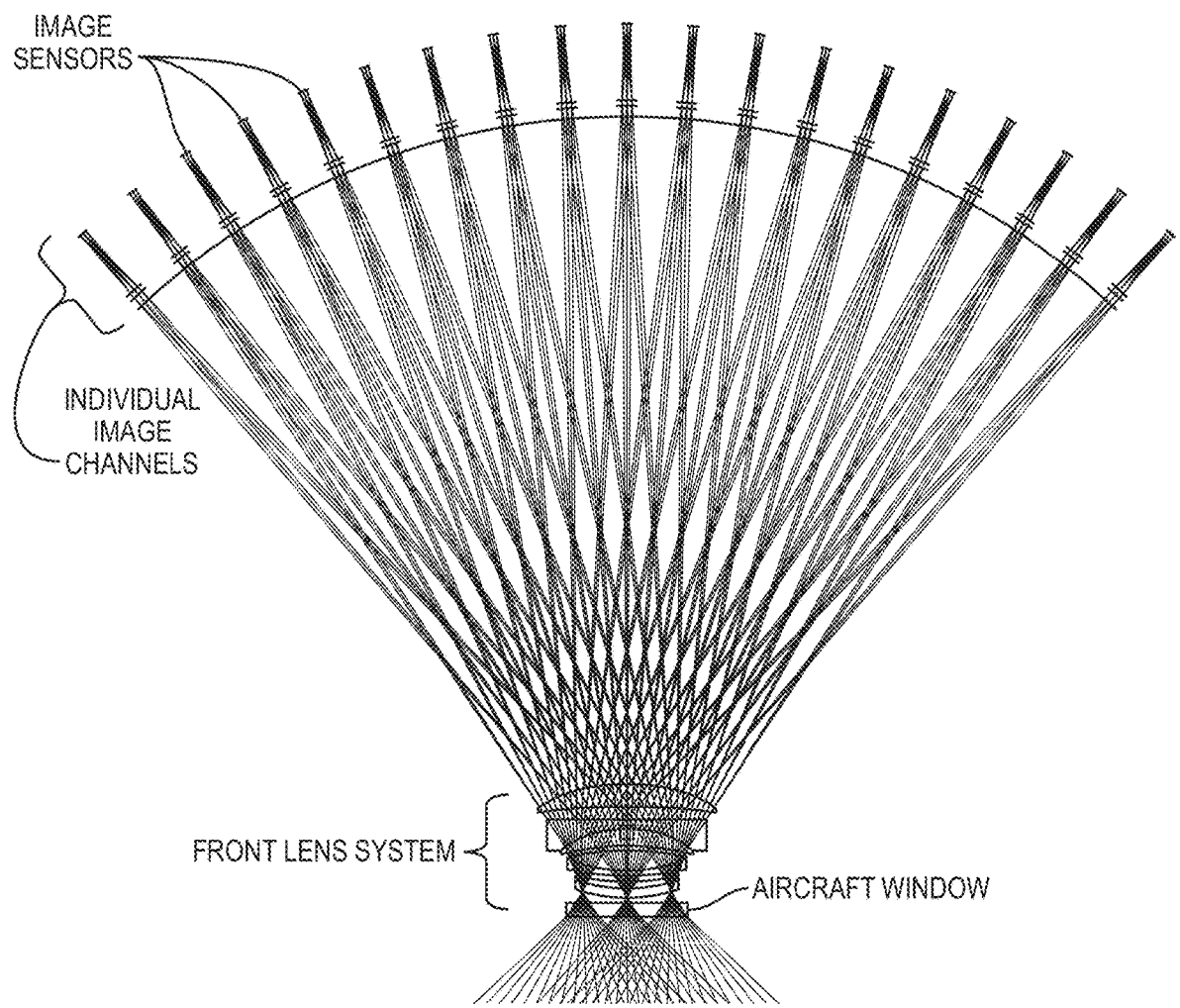

One embodiment is to use per-sensor image relay subsystems. With these, the light is brought to an intermediate image by the primary mirror and this image is then relayed to the image sensor. This offers several benefits. The image relay lenses can remove the need for a curved secondary mirror in a catadioptric based system, as the image relay lenses can perform the image correction which would be carried out by a curved secondary mirror. This in turn allows use of flat mirrors instead of a curved secondary mirror, which allows a range of packaging options, for example to place the sensors to the sides of the primary mirror, rather than above the primary mirror. In addition, the (typically flat) folding mirrors can be placed near the intermediate image created by the primary mirror which is then between the aperture stop and the primary mirror. In placing the folding mirrors at or near the intermediate image, only a small portion of the incoming light is obstructed by the folding mirrors. This has great advantages in terms of light collection and resolution, as the image contrast is greatly impacted by the size of the obscuration. Also, the use of image relay units allows to select a (spherical) primary of almost arbitrary curvature as the total system focal length is determined by the combination of primary mirror and relay sub-system. This presents an additional degree of freedom in the design and offers the adaptation to available space within an aircraft or spacecraft as the curvature of the primary mirrors determines the separation to the aperture and hence usually the separation to the aircraft window. With the use of folding mirrors near or at the intermediate image the gap between adjacent image channels is also optimized. Furthermore, and in a general case including using other types of primary mirror subsystems, per-sensor image relay subsystems can simplify issues including focus refinement, forward motion compensation, and vibration issues as detailed below. FIGS. 5A-5B show examples of the use of per-sensor image relay lens subsystems for a catadioptric primary lens subsystem (FIG. 5A) and for a stop at center primary lens subsystem (FIG. 5B).

Figure 10A:
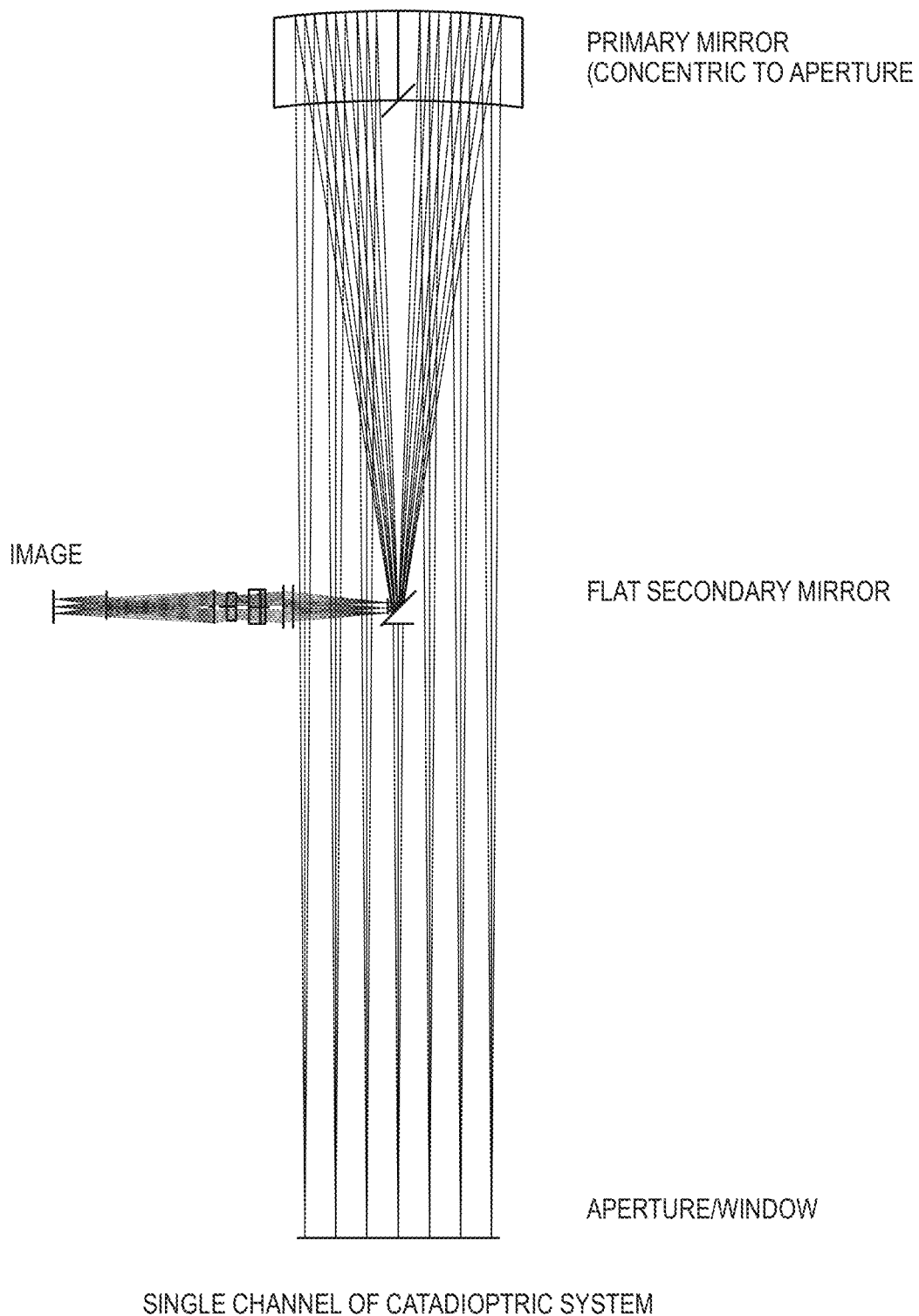
FIGS. 10A-10B shows one of many and two of many sensor channels for a Catadioptric primary lens subsystem based system, with individual per-sensor channel flat secondary mirrors.
Figure 10B:
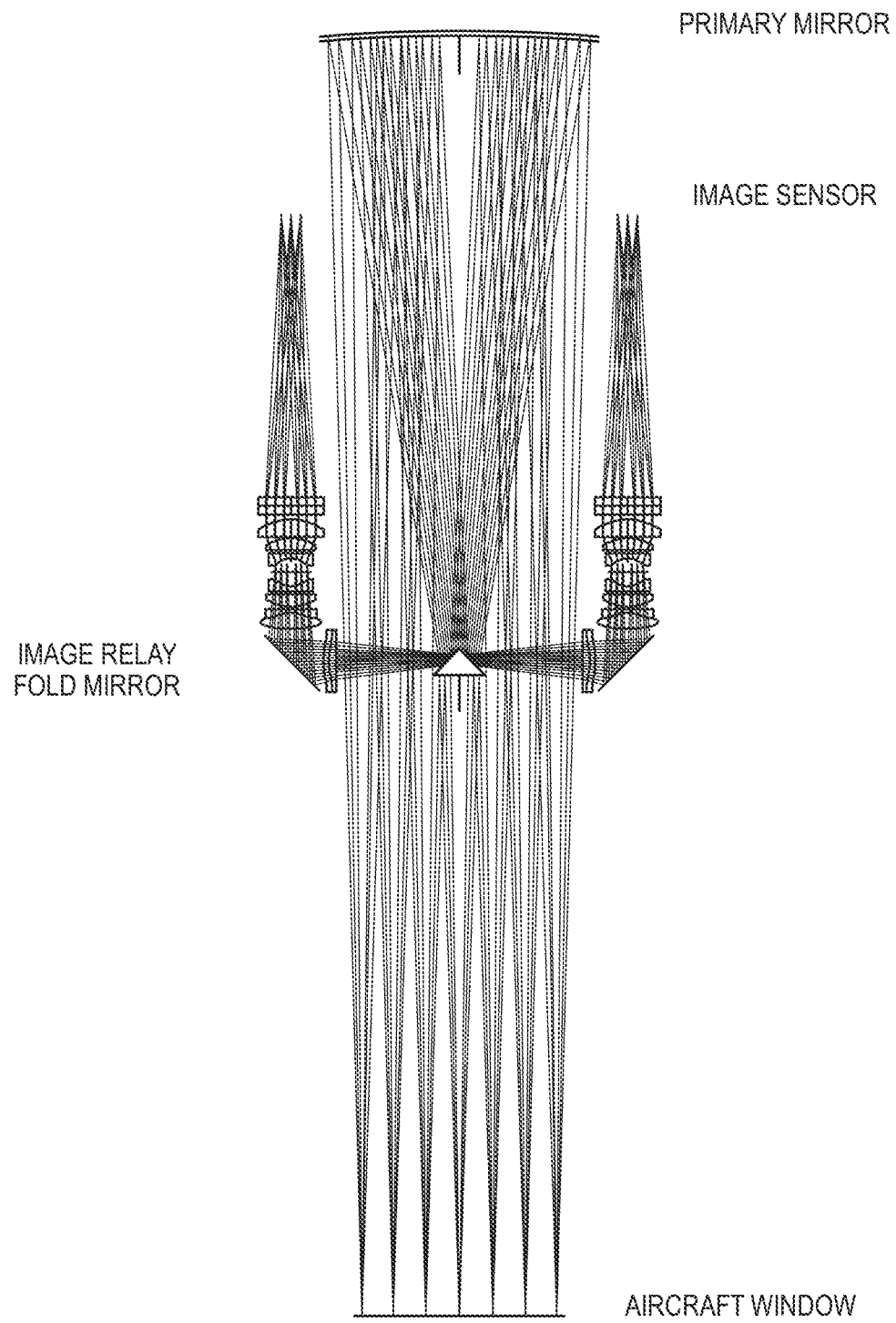
Figure 10C:
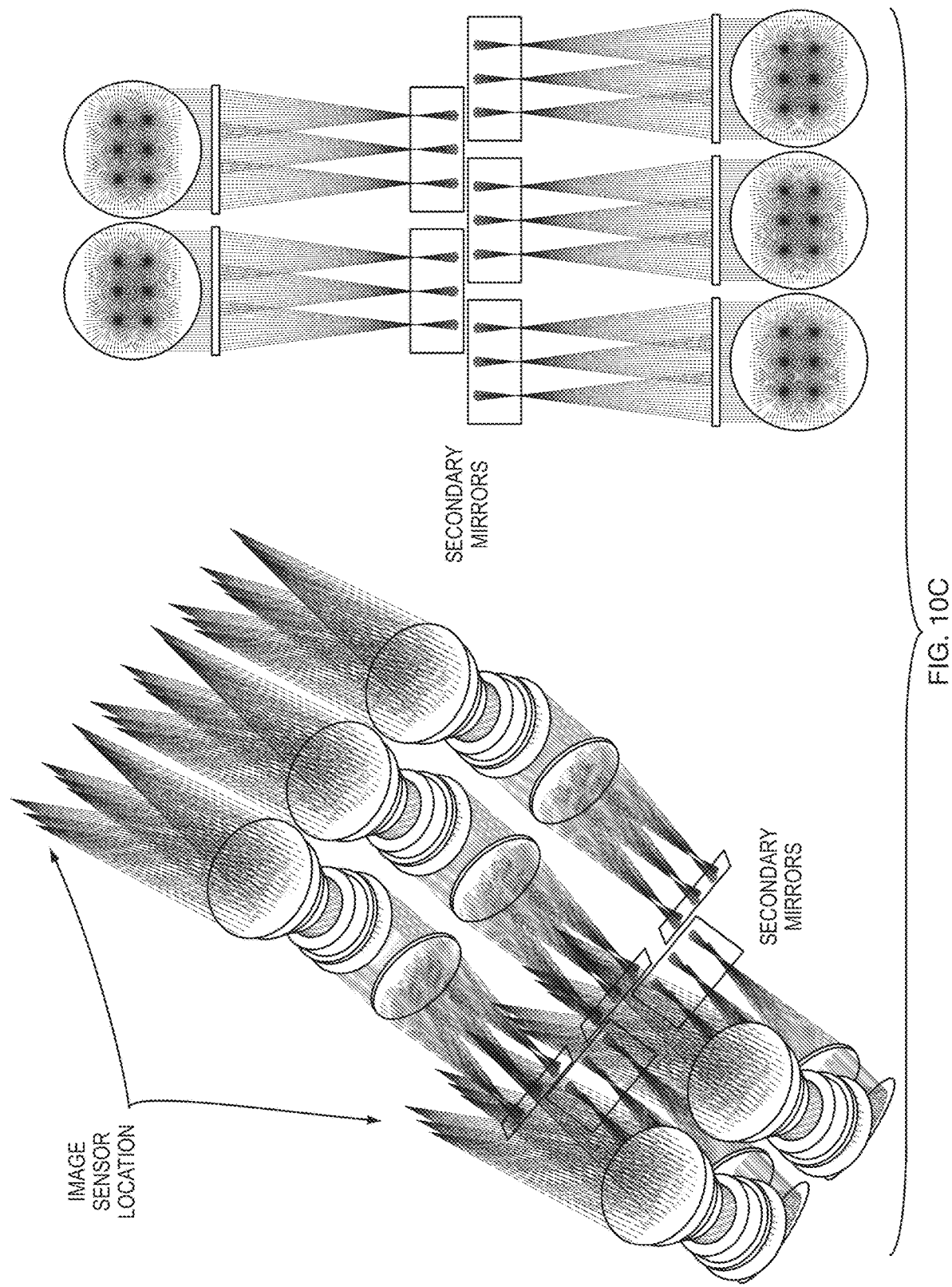
FIG. 10C shows 5 of many sensor channels for a Catadioptric primary lens subsystem based system, where sensors are arranged in a two staggered rows, enabling seamless capture when the system travels forward in the flight direction.

FIGS. 10A-10B shows one of many and two of many sensor channels for a Catadioptric primary lens subsystem based system, with individual per-sensor channel flat secondary mirrors. FIG. 10C shows 5 of many sensor channels for a Catadioptric primary lens subsystem based system, where sensors are arranged in a two staggered rows, enabling seamless capture when the system travels forward in the flight direction.

One embodiment uses multiple flat secondary mirrors to reflect the scene out to the image sensors. In this approach, image relay lenses are then used to correct any final aberrations (e.g., distortions) or defocus issues, on a sensor by sensor basis. Thus, image sensors within an arc share the same primary spherical mirror surface, although each image sensor sees only a portion of that primary mirror surface, and each image sensor has its own secondary image relay lens to make final optical adjustments.

Alignment of the image relay lenses and the image sensors have relaxed precision requirements in most axes, except in the optical focal axis, where precision must be very precise. To address this, each image sensor can be managed by piezoelectric actuators to bring the sensor into optical alignment. Dealing with focus in this way has an added advantage: on average, the ground is 1.4 times further away on the 45 degree obliques compared to the nadir imagery. At long focal lengths, as used by embodiments of the present invention, this difference in focal length can be significant enough to require fine tuning of focus that varies between far obliques and nadir. The piezoelectric actuators managing each individual image sensor can adjust for this difference in focal distance. As the secondary mirror obstruction is the primary cause for Point Spread Function degradation, the primary mirror is effectively over specified, so we have more tolerance for misalignment than would normally be the situation.

Within a sensor arc, it is difficult or even not possible to perfectly butt each sensor to the next sensor to form a seamless sensor arc.

As result, there will be a strip between neighboring image sensors, where no image data is gathered. There are several ways to address this deficiency, which can be used individually or in combination.

Figure 6A:
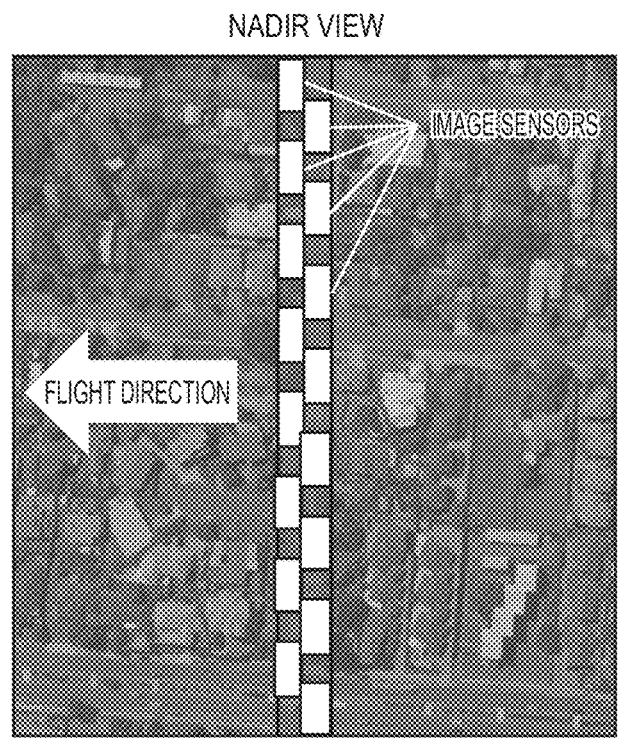
FIGS. 6A-6B show how staggering sensors in a sensor arc enables full survey capture capability, despite gaps between sensors, as the platform moves in the flight direction.
Figure 6B:
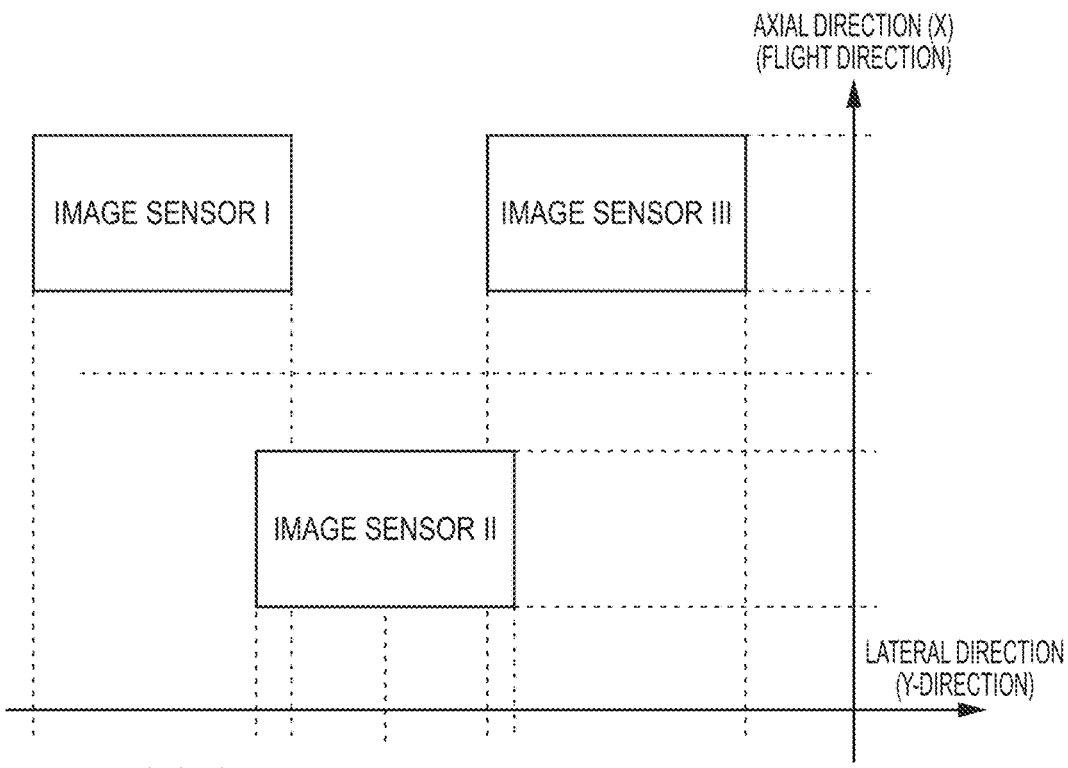

One solution is to stagger two arcs of image sensors, instead of one arc, to cover the desired arc. The two arcs can be offset from one other, and with more distance between each image sensor within each arc, such that the forward motion of the sensor platform captures contiguous data. Examples of this staggered arc approach are shown in FIGS. 6A-6B. Another solution is to include a scanning mirror in front of the primary lens subsystem, which moves to fill in gaps between the image sensors. Both approaches have advantages. The staggered two arc approach enables a solution without scanning mirrors, and provides for very high capture speed not constrained by image sensor capture or download speed. The scanning mirror approach can significantly reduce the number of image sensors required, especially if coupled with an overall reduction of the arc size, which can be filled in with further movement by the scanning mirror. However, the scanning mirror system can not use as much light from a given camera hole in an aircraft, and introduces potential sources of vibration. It will be understood that any approach that rotates the sensors relative to the primary arc or relative to the ground achieves the requirement of filling in sensor gaps, and so more complex approaches such as moving the sensors or the entire arc is also possible.

Figure 15A:
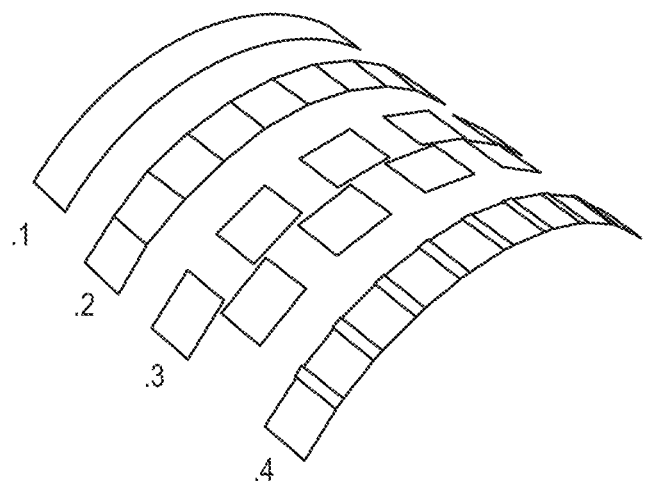
FIG. 15A shows for arc sensors (1) a hypothetical single arc sensor (2) an arc sensor made up from individual planar image sensors, but unable to capture imagery at the butt edges of sensors and (3) an embodiment of this invention, showing two offset and staggered rows of planar image sensors to create complete capture when the sensor platform moves forward in the flight direction and (4) an embodiment of this invention, showing a scanning mirror approach filling in overlapping image segments to create complete capture when the sensor platform moves forward in the flight direction.
Figure 15B:
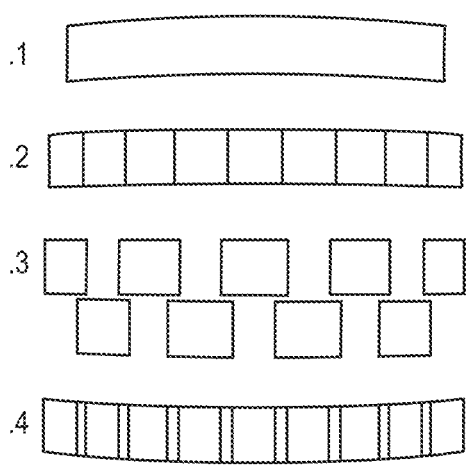
FIG. 15B shows the same examples as in FIG. 15A, from an overhead perspective of the imaging arcs.

FIG. 15A shows for arc sensors (1) a hypothetical single arc sensor (2) an arc sensor made up from individual planar image sensors, but unable to capture imagery at the butt edges of sensors and (3) an embodiment of the present invention, showing two offset and staggered rows of planar image sensors to create complete capture when the sensor platform moves forward in the flight direction and (4) an embodiment of the present invention, showing a scanning mirror approach filling in overlapping image segments to create complete capture when the sensor platform moves forward in the flight direction. A slightly longer sensor in the arc axis has been chosen in the (3) and (4) embodiment examples shown here. An alternative would be to move smaller sensors closer together to ensure sufficient overlap. Typically only 1% to 10% of overlap is required, so very little of sensor capture is wasted in redundant capture. FIG. 15B shows the same examples as in FIG. 15A, from an overhead perspective of the imaging arcs.

Figure 11:
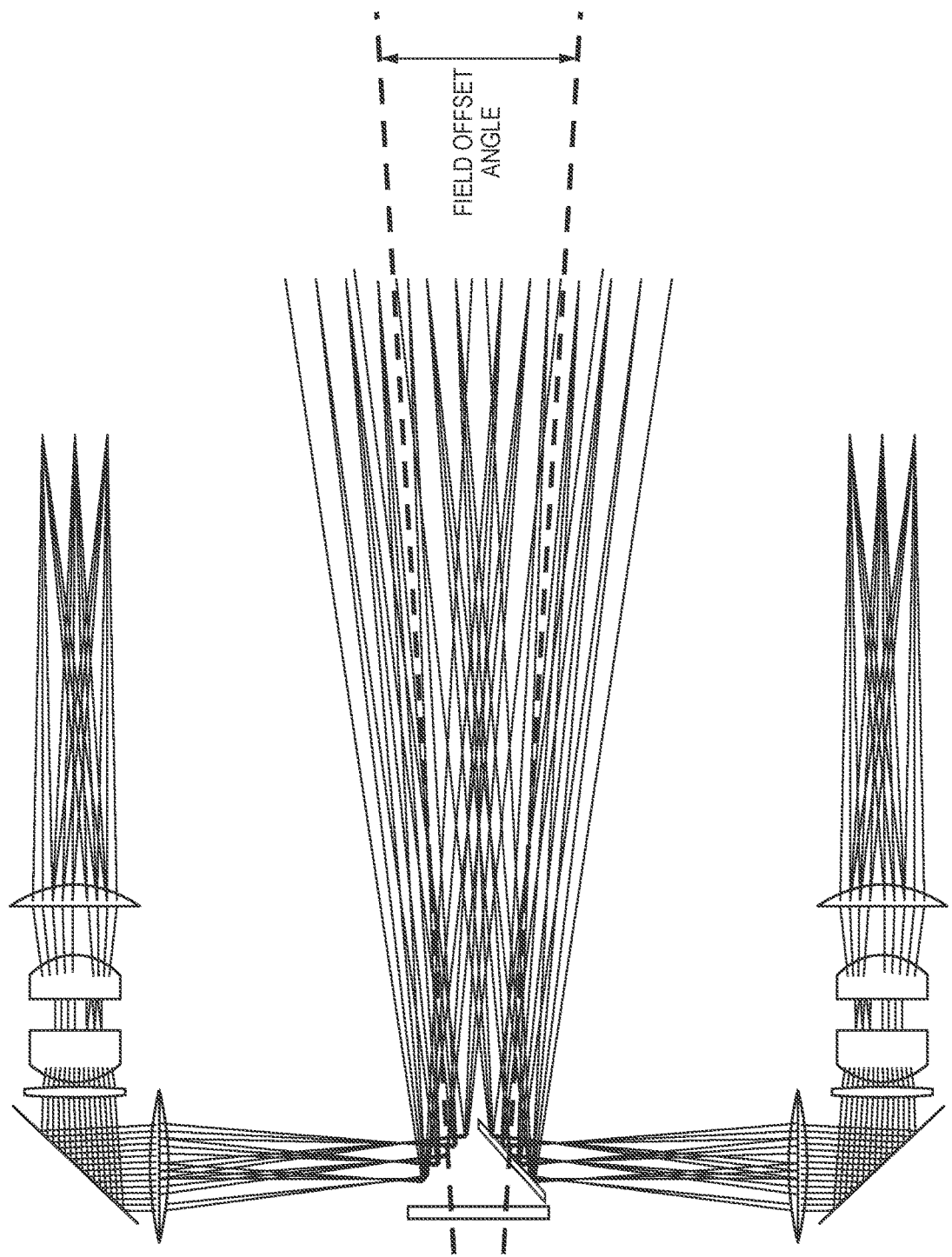
FIG. 11 shows that there is a very small field offset angle between sensors on two staggered rows on an arc.
Figure 12:
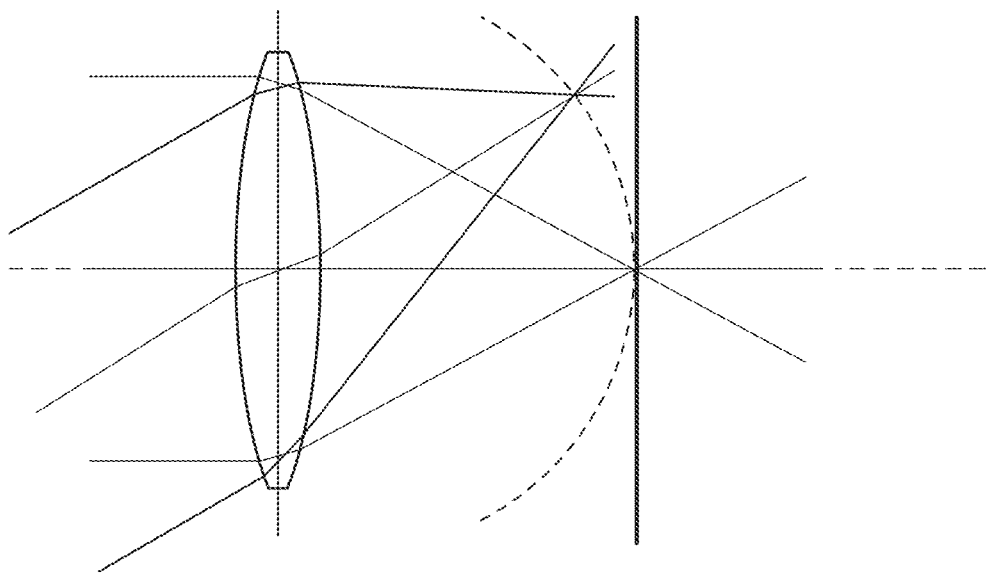
FIG. 12 showing the Petzval Field Offset issue, where the natural focal point is along a curved image surface and not along a planer image surface.

When staggered rows of sensors are used, there is a field offset, which is a difference in forward view angle between sensors on different rows. FIG. 11 shows that this very small field offset angle effect is minimal, and as result does not pose a problem when stitching imagery together into a seamless photo map.

Another well understood issue that is addressed by embodiments of the present invention is forward motion blur compensation. Given the high speed of the aircraft or spacecraft in the forward direction, ground features will be blurred across hundreds of image sensor pixels in the forward motion direction. Although the radial amount of forward motion blur is very small, in the order of 0.01 degrees in one example embodiment, it is still critical to eliminate. Forward Motion Compensation is a well understood requirement for sensor platforms in motion such as aerial or spaceborne imaging systems, and forward motion compensation can be achieved in multiple ways. The objective is to keep the sensor view stationary with respect to the ground for the duration of image capture by the sensor, where image capture duration is typically in the order of 1 ms to 100 ms. To do this, in effect the view of the ground relative to the sensor has to move at the same rate as the motion blur, to eliminate the problem. There are multiple ways that this can be implemented elegantly in embodiments of the present invention, due to the arc sensor design and due to multiple sensors being inherent to the design.

Because the sensors are in an arc, appropriate rotation of some element of the sensor platform will elegantly address the problem.

One embodiment uses the primary mirror alignment actuators to perform the Forward Motion Control. However, other embodiments will also work, such as mounting actuators on each sensor, or inserting an actuator controlled alignment lens with the Image Relay for each sensor, or using a scanning mirror in front of the primary lens subsystem.

The particular embodiment that is selected depends on which implementation is more desirable to address other requirements for the scanning platform. For example, if a particular embodiment includes a scanning mirror, then that can also be used for forward motion compensation.

When actuators are used to simultaneously align primary mirrors and to do forward motion compensation, this can also simplify. This approach also enables off-axis motion compensation, for example when the aircraft is flying at a crab angle due to a strong cross window, or has low frequency periodic vibration. These noise inputs can largely be eliminated with the same actuators.

One embodiment is to have sensors covering the full arc range, for example +45 to −45 degrees for the primary nadir arc, as discussed above.

Another embodiment uses scanning mirrors in front of the primary lens subsystem. Even slow moving scanning mirrors that update position a few times per second can significantly reduce the sensor arc size. This avoids the vibration issues that cause issues with classic scanning mirror systems, while at the same time reducing the overall size of the sensor platform.

Embodiments of the present invention have numerous benefits. For example, certain embodiments of the present invention can view +/−45 degrees off nadir through a standard 30 cm camera hole. Certain embodiments of the present invention enable full capture of 3 oblique strips, while providing low duty cycle on imaging sensors, which results in less thermal expansion and errors during photogrammetric post processing. The significant number of sensors also allows parallel reading from each sensor. Certain embodiments of the present invention can easily capture 20 gigapixels or more per second, which may be necessary to capture high resolution and oblique from high altitude aircraft. Spaceborne versions of embodiments of the present invention may capture even higher rates, such as in the hundreds of gigapixels per second. This makes very high resolution full imaging possible from earth orbit.

Higher resolution capture, such as 3 cm, is possible with a slightly longer focal length. For satellite systems, embodiments of the present invention may enjoy a very long focal length, measured in meters, and the optical path can be folded to reduce overall system size.

Quantifying Embodiment Parameters

Embodiments of the present invention may have a number of parameters that can be varied in different embodiments. This section provides quantitative examples of ranges of values for these parameters. The particular parameter values disclosed above and below are merely examples and do not constitute limitations of the present invention. Any statements herein indicating that particular parameter values are required, necessary, desired, preferred, or the like, should be understood not to constitute limitations of the present inventions, since any such parameter values may be varied to fit the requirements or preferences of particular embodiments.

One parameter is the desired ground resolution for pixels at Nadir, where generally it is desired to have as high a resolution as possible. Embodiments of the present invention may, for example, have a value in the range of 2 cm to 10 cm ground pixel resolution, although embodiments of the present invention could also be used for higher and lower resolution pixels if required or desired. Whereas 10 cm resolution is considered to be very good resolution for existing online imagery maps and 7.5 cm resolution to be exceptional, embodiments of the present invention enable even higher resolutions, such as ≤5 cm and ≤3 cm resolution being possible, even though the aircraft can fly about three times higher altitude than typical prior-art systems. This is a significant benefit of embodiments of the present invention. Note that information content increases with the square of resolution; as 3×3=9 pixels of 3.3 cm resolution can fit into a single pixel of 10 cm resolution, a 3.3 cm resolution solution offers 800% more information content than a 10 cm resolution solution.

The focal length, coupled with the size of each imaging cell within a sensor, defines the possible pixel ground resolution that can be obtained from a given altitude. Whereas prior-art solutions have difficulties or can not implement focal lengths over about 300 mm at all, embodiments of the present invention work with focal lengths that are greater than 200 mm. The range of focal lengths that can be used for embodiments of the present invention include from about 200 mm to over 20,000 mm, where shorter focal lengths of about 200 mm to 400 mm range are typically used for 5 cm to 10 cm ground pixel resolution when the sensor platform is flying at a medium altitude surveys from 10,000 to 15,000 feet as is common with existing prior art solutions, to long focal lengths of around 1,000 mm to 2,000 mm for high altitude surveys from 35,000 feet to 50,000 feet for 3 cm to 7 cm ground pixel resolution, to very long focal length of around 3,000 cm to 20,000 mm for satellite based surveys from 600 km to 800 km orbit height for a sun synchronous orbit, which is a desirable attribute for a satellite imaging platform. The focal length may be selected from desired survey resolution from a given altitude, which coupled with sensor cell size will define the pixel ground resolution.

The amount of curvature for sensor arc(s) is related to focal length. The longer the focal length, the larger the radius of the arc and thus the flatter the arc becomes. As multiple sensors are used to approximate the ideal arc curve, smaller sensors can more accurately approximate an arc than fewer larger sensors. The maximum defocus allowed due to sensor pixels not being on the ideal arc can be calculated using optical wavefront modeling software. Typically, defocus of several hundred microns can be tolerated, especially if secondary image relay lens sub-systems are used in front of each sensor. Furthermore, the secondary image relay lens sub-systems may correct field curvature. For the long focal length in the order of meters (for airborne applications) to 10s of meters (for spaceborne applications), defocus due to sensor distance from the ideal is not a significant issue. However, if an embodiment is desired for a much smaller focal length of around 200 mm, which is similar to existing prior-art focal lengths, then the arc is less flat, and smaller sensors and/or secondary image relay lenses must be used and careful analysis of defocus limits will be required. This also in effect places a lower limit on ideal focal length; the invention is optimal when focal length is above 200 mm. There is no real upper limit on focal length other than that placed on manufacture of optical components, and focal lengths in the 10 s of meters are possible for spaceborne applications, where the optical path can be folded to reduce the physical dimensions.

Embodiments of the present invention may place sensors along the ideal arc just as one might use line segments to draw and approximate an arc from a circle. A critical design parameter is the defocus caused by parts of sensors not being on the ideal arc curve. It will be understood that for a given arc, if more and smaller sensors are used, then the error reduces. Also, if the radius of the circle that forms an arc is increased, then the error again reduces for a given size sensor, as the sensor surface will be closer to the ideal arc curve. By analogy, again considering line segments to approximate a circle, using just four line segments would result in a square shape which give a very poor approximation of a circle, whereas using 100 line segments significantly improves the approximation, and 1,000 line segments further improves it. Also, if one makes the circle larger, then more line segments of a given size are required to draw the circle, however the error also reduces as the circle gets larger.

The per-sensor field of view within an arc depends on the sensor size and the focal length. Typically, the non-overlap per-sensor field of view will be slightly smaller than the full per-sensor field of view. This ensures that there is overlap between images captures across an arc, which can be processed into seamless views using the usual photogrammetric processing software.

For simplicity, the remainder of the examples in this section will use a non-overlap per-sensor field of view of one degree in the arc direction, but as detailed above this value is an embodiment parameter that can be varied by changing focal length and/or sensor size. As a guide, the per-sensor field of view is typically ranges from 0.1 degrees for spaceborne applications to 10 degrees for very small embodiments replacing existing prior-art solutions, with around 1 degree per-sensor field of view common for high altitude applications.

The field of view for each arc is also a parameter selected for a particular embodiment. A field of view of around 90 degrees is most useful, with higher field of views possible but typically not adding much value. Smaller field of views, such as only 30 or 45 degrees, are as possible and might be of value where the sensor platform has very tight packaging constraints but generally are less desirable. It is also possible to leave out sensors from part of the arc. For example, the arc field of view in the −25 degrees to −35 degrees and +25 degrees to +35 degrees might not be required for a specific application, and so these sensors could be left out of that embodiment.

Figure 8B:
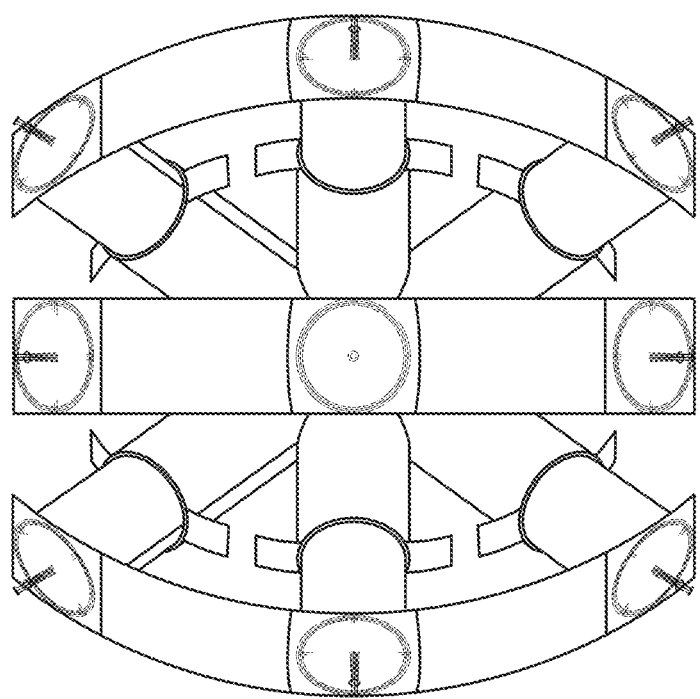
FIGS. 8A-8C show three different views of an embodiment which uses 3 arcs to capture forward, Nadir and rear obliques in the direction of the flight path. Each arc has many sensors, however only three sensors and light paths are shown for each arc in these figures for simplicity, at the Nadir and angle extrema.
Figure 8A:
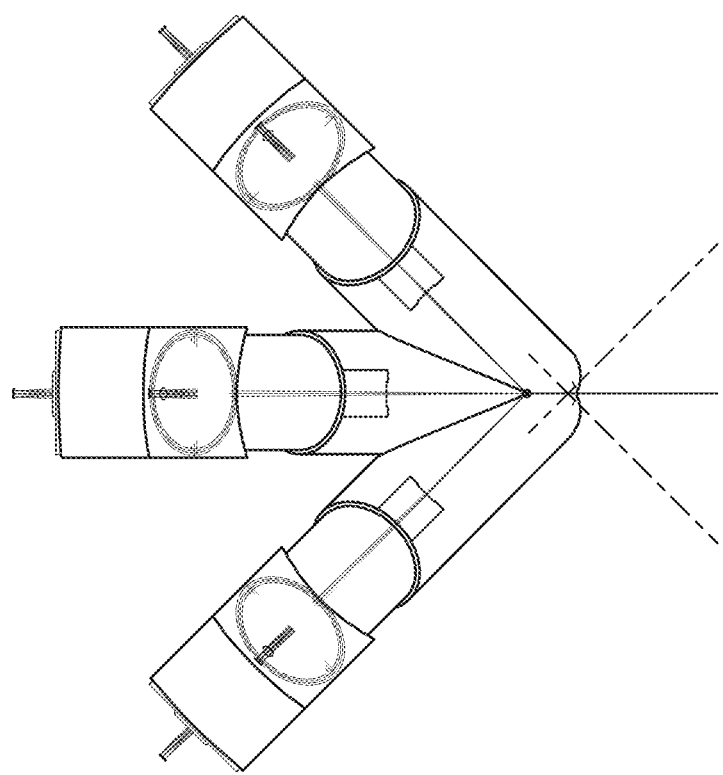
Figure 8C:
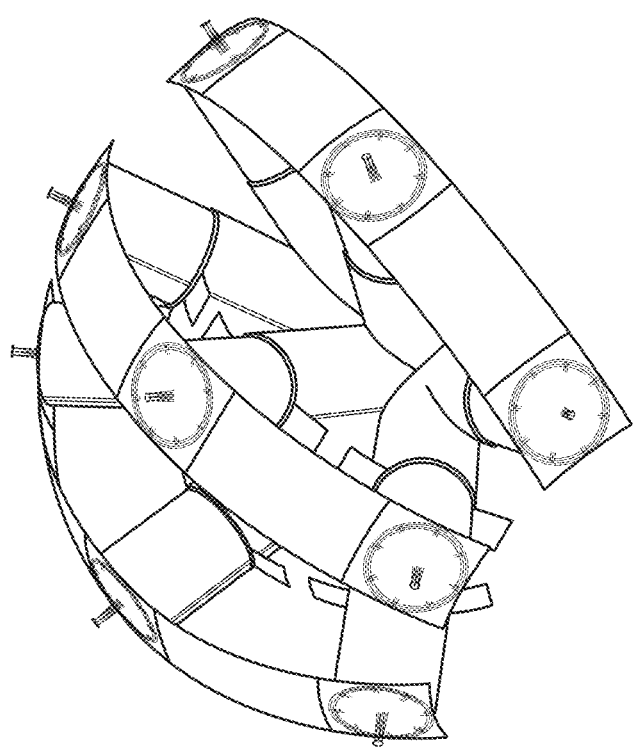

Embodiments of the present invention enable the use of more than one arc of sensors. Each arc can be angled in a different direction, which will result in different oblique views being captured as the sensor platform progresses in the flight direction. A typical embodiment might use 3 arcs each of 90 degree field of view. This enables capture of 8 oblique views and nadir, which is a common requirement. FIGS. 8A-8C show three different views of an embodiment which uses 3 arcs to capture forward, Nadir and rear obliques in the direction of the flight path. Each arc has many sensors, however only three sensors and light paths are shown for each arc in these figures for simplicity, at the Nadir and angle extrema.

Prior art solutions often only capture 2 obliques and nadir, due to limitations detailed at the start of this patent. Embodiments of the present invention can also use a single arc, which enables a smaller design to replace prior art solutions. Embodiments of the present invention are not limited to any particular number of arcs, so 2, 4 or even 5 arcs could be used subject to packaging constraints, however 1 or 3 arcs are the most common and useful embodiments.

If an embodiment has a 90 degree field of view and no scanning mirror, then 90 sensors would be required to cover the 90 degree field of view, if each sensor has a non-overlap field of view of 1 degree in the arc direction. The sensors would usually be placed in two staggered rows on the arc, as it is not normally possible to place sensors edge to edge.

If a scanning mirror is added in front of an arc's primary lens subsystem, then further parameter modifications are possible, as sensors can be removed from the sensor arc, with the scanning mirror used to scan different portions of the total desired arc. Embodiments of the present invention enable considerable flexibility in how scanning mirror embodiments are implemented. In an example where the scanning mirror can be moved 6 times per capture of an arc without vibration issues, then one embodiment with tight packaging constraints might choose to place 15 sensors, still in two staggered rows, in 1 degree offsets such that this sub-arc has a field of view of 15 degrees (assuming 1 degree non-overlapped sensor field of view). The scanning mirror can then be moved from 0 degrees to 15, 30, 45, 60, 75 and back 0 degrees to achieve a full 90 degree arc capture. Another embodiment might choose to use a larger scanning mirror which must be moved less distance each time in order to reduce vibration, and such an embodiment might chose to implement the full view of view of 90 degrees, with 6 degrees between each sensor. In this instance, only one row of sensors is required per arc as the sensors are not overlapping. The scanning mirror can then be moved from 0 degrees to 1, 2, 3, 4, 5 and back to 0 degrees, again resulting in a full 90 degree arc capture. Many other variations are possible, for example a sub-arc with 15 sensors spaced 2 degrees apart so with a 30 degree field of view. In this instance, the scanning mirror could move from 0 degrees to 1, 30, 31, 60, 61 and back to 0 degrees to achieve capture of a full arc.

It can be seen that adding a scanning mirror in front of the primary mirror enables a wide range of embodiments, which can be optimized to address particular applications or design constraints.

Two factors that are significant when considering scanning mirrors are the amount of light that needs to be seen per sensor capture event and thus the size of the scanning mirror, and damping of vibration after the mirror stops moving, as any vibration or distortion of the mirror surface will degrade image quality. The size of the scanning mirror can be optimized for the given application. As a specific example, an embodiment might require capture every 500 ms (two times per second) along the flight line, to ensure capture with sufficient overlap between images in the flight line direction.

As larger mirrors provide more light, which is beneficial, but have more mass and so are slower to accelerate and stop and have more vibration issues, design of specific embodiments would normally start by doing optical modeling to confirm sufficient light is available, and then mechanical modelling to ensure thermal, acceleration and vibration parameters are acceptable. One significant advantage embodiments of the present invention offer over prior-art is the ability to have many fewer mirror movements per second, by increasing the number of sensors in an arc. For example, if a system requires a 90 degree field of view with 1 degree sensors, but acceleration and vibration constraints limit mirror movement to only 6 movements to complete scan of an arc, then use of 15 sensors across the arc would meet these design constraints. In this example, prior-art solutions would scan only 6 degrees before exceeding mirror movement limits, whereas this invention allows scanning the full 90 degrees, so this is a significant advantage. Notably, embodiments of the present invention also allow a design to start from the maximum scanning rate possible for a given size and construction of scanning mirror, and then work backwards from this constraint to reduce the overall number of sensors required.

Packaging of large optical systems, such as used by embodiments of the present invention, requires careful consideration of thermal, optical, vibration damping, mass and power and communication issues. There are often tradeoffs that need to be made here. For example, it is desirable to minimize the mass of the system for aerial survey applications, and the system might need to have a maximum size so it can be physically moved into the mounting point inside the aircraft through a door of limited dimensions.

Embodiments of the present invention have few constraints in this respect, and parameters can be defined in accordance to restrictions or desired attributes. Optical engineering in this respect is a well understood industry, and techniques developed there can be applied to embodiments of the present invention. For example, it might be desirable to reduce the overall height of the sensor platform, to fit into a space constrained fuselage of an aircraft. In this case, light path folding mirrors can be used to change the orientation of secondary image relay lenses and sensors to be at right angles to the arc, or multiple light path mirrors can be used to compress overall dimensions. If secondary image relay lenses are being used, but optically are too large to fit adjacent sensors, then a scanning mirror in front of the primary lens subsystem can be used to remove some of the sensors from the system, thereby freeing up space for bulky optical components. Furthermore, the focal length of the entire system is a product of the magnification of the primary mirror and the secondary image relay system. Hence, the individual magnifications of these two subsystems can be altered and the entire system can still deliver the same focal length.

What is claimed is:

1. An imaging survey platform comprising:
   a first plurality of imaging sensors arranged in a first arc, wherein each of the first plurality of imaging sensors is flat;
   a first primary lens subsystem arranged to project light onto the first plurality of imaging sensors, such that each of the first plurality of imaging sensors senses a corresponding portion of a strip of ground to be surveyed, wherein the first arc is a sub-section of a first curved surface; and
   a second plurality of imaging sensors arranged in a second arc that is offset from the first arc, such that each of the second plurality of imaging sensors senses a corresponding portion of a second strip of ground to be surveyed, wherein gaps between imaging sensors in the first plurality of imaging sensors are filled in by the second plurality of imaging sensors, wherein the second arc is a sub-section of a second curved surface, wherein each of the second plurality of imaging sensors is flat,
   wherein the portions of the strips of ground sensed by the first plurality of imaging sensors and the portions of the strips of ground sensed by the second plurality of imaging sensors are not identical.

2. The imaging survey platform of claim 1, further comprising:
   a second primary lens subsystem arranged to project onto the second plurality of imaging sensors.

3. The imaging survey platform of claim 1, further comprising:
   a scanning mirror positioned between the first primary lens subsystem and the first plurality of imaging sensors to fill in gaps between the first plurality of imaging sensors.

4. The imaging survey platform of claim 1, further comprising:
   a scanning mirror positioned in front of the first primary lens subsystem and the first plurality of imaging sensors to fill in gaps between the first plurality of imaging sensors.

5. The imaging survey platform of claim 1, wherein the first plurality of imaging sensors includes at least 10 imaging sensors.

6. The imaging survey platform of claim 1, wherein the first plurality of imaging sensors includes at least 100 imaging sensors.

7. The imaging survey platform of claim 1, wherein the first primary lens subsystem comprises a catadioptric lens subsystem.

8. The imaging survey platform of claim 7, wherein the catadioptric lens subsystem comprises a curved surface secondary mirror.

9. The imaging survey platform of claim 7, wherein the catadioptric lens subsystem comprises a per-sensor image relay lens subsystem.

10. The imaging survey platform of claim 7, wherein the primary lens subsystem has an intermediate focus.

11. The imaging survey platform of claim 7, wherein the catadioptric lens subsystem comprises a flat secondary mirror.

12. The imaging survey platform of claim 11, wherein the catadioptric lens subsystem comprises a plurality of flat secondary mirrors and a plurality of image relay lenses.

13. The imaging survey platform of claim 1, wherein the first primary lens subsystem comprises a stop at center lens.

14. The imaging survey platform of claim 1, wherein the first primary lens subsystem comprises a monocentric lens.

15. The imaging survey platform of claim 1, wherein the first primary lens subsystem comprises a stop at front lens.

16. The imaging survey platform of claim 1:
   wherein there is a total light path from the first primary lens subsystem;
   wherein, for each of the first plurality of imaging sensors, there is a corresponding light path from the first primary lens subsystem to that imaging sensor, the corresponding light path being a subset of the total light path from the first primary lens subsystem;
   wherein, for each neighboring pair of imaging sensors in the first plurality of imaging sensors, the light paths corresponding to the pair of imaging sensors overlap; and
   wherein the light paths corresponding to at least two non-neighboring imaging sensors in the first plurality of imaging sensors do not overlap.

17. The imaging survey platform of claim 1, further comprising:
   a viewing hole,
   wherein the primary lens subsystem is between the viewing hole and the first plurality of imaging sensors, and
   wherein the viewing hole is narrower than the primary lens subsystem.

18. A method for use with an imaging survey platform, the imaging survey platform comprising;

a first plurality of imaging sensors arranged in a first arc, wherein the first arc is a sub-section of a first curved surface, wherein each of the first plurality of imaging sensors is flat; and a first primary lens subsystem;

the method comprising:

at the first primary lens subsystem, imaging a portion of surveyed ground, comprising:

receiving light from the portion of surveyed ground; and projecting the received light onto the first plurality of imaging sensors;

at the first plurality of imaging sensors:

receiving the projected light from the first primary lens subsystem;

at each of the first plurality of imaging sensors, sensing, based on the received light, a corresponding portion of the portion of surveyed ground;

and imaging a plurality of portions of the surveyed ground by flying the imaging survey platform over the plurality of portions of the surveyed ground to receive light at the first primary lens subsystem from the plurality of portions of the surveyed ground and to project light corresponding to each of the plurality of portions of the surveyed ground to the first plurality of imaging sensors.

19. The method of claim 18, wherein the imaging of the plurality of portions of the surveyed ground is performed at a rate of at least ten million km² per year.

20. The method of claim 19, wherein the imaging of the plurality of portions of the surveyed ground comprises imaging at least ten million km² in no more than one year.

21. The method of claim 18, wherein the imaging of the plurality of portions of the surveyed ground is performed at a rate of at least 10,000 km² per hour.

22. The method of claim 21, wherein the imaging of the plurality of portions of the surveyed ground is performed at a rate of at least 28,000 km² per hour, of which at least 10,000 km² per hour images non-overlapped ground.

23. The method of claim 18, wherein flying the imaging survey platform comprises flying the imaging survey platform at an altitude of at least 43,000 feet over the plurality of portions of the surveyed ground.

24. The method of claim 18, wherein receiving the light comprises capturing at least one nadir view and at least one oblique view of the portion of the surveyed ground.

25. The method of claim 24, wherein receiving the light comprises capturing at least 8 oblique views and at least one nadir view of the portion of the surveyed ground.

26. The method of claim 24, wherein receiving the light comprises imaging at least three portions of the portion of surveyed ground at −45, 0, and +45 degrees in the pitch axis, and in a range of +45 degrees to −45 degrees in the roll axis.

27. The method of claim 18, further comprising:

at each of the first plurality of imaging sensors, generating output based on the light received by that imaging sensor; and applying photogrammetric processing to the outputs of the first plurality of imaging sensors to generate a map of the portion of surveyed ground.

28. The method of claim 18, wherein imaging the portion of surveyed ground comprises imaging the portion of surveyed ground at a resolution of no more than 5 cm.

29. The method of claim 18, further comprising:

using adaptive optics to adjust the primary lens subsystem, such that only the portion of the primary lens subsystem imaged by each of the first plurality of imaging sensors is in precise optical alignment relative to that imaging sensor.

30. The method of claim 29, wherein the adaptive optics comprises a mirror.

31. The method of claim 18, wherein each of the first plurality of imaging sensors is mounted on a corresponding computer with a corresponding piezoelectric actuator, and wherein the method further comprises:

at the computer corresponding to each of the first plurality of imaging sensors, using the corresponding piezoelectric actuator to fine-tune alignment of that imaging sensor relative to the first primary lens subsystem.

32. The method of claim 18, further comprising:

rotating a scanning mirror in the pitch axis to reduce forward motion blur of the imaging survey platform.

33. The method of claim 18, further comprising:

using a plurality of piezoelectric actuators to rotate the first primary lens subsystem and the first plurality of imaging sensors relative to each other.

* * * * *